Oct. 11, 1949.                    D. R. PUTT                    2,484,049
                              ELECTRICAL CONTROLS
Filed April 22, 1939                                        8 Sheets-Sheet 1
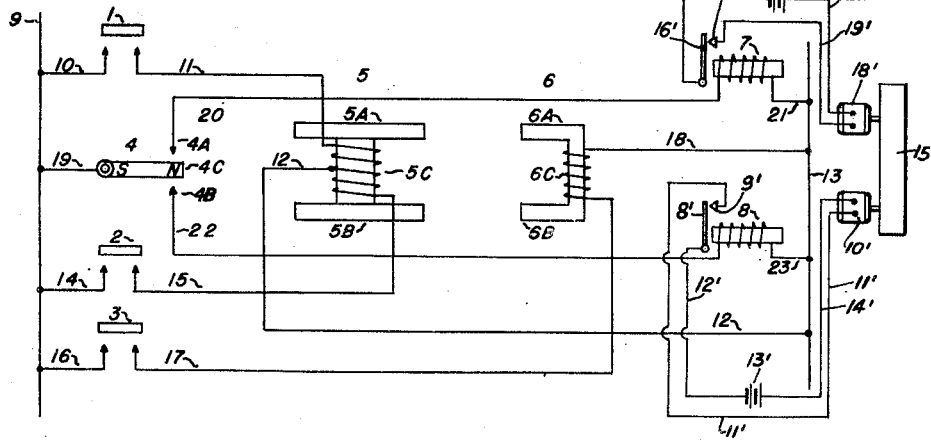
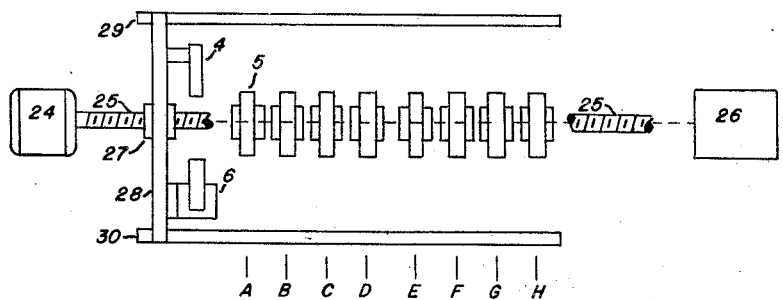
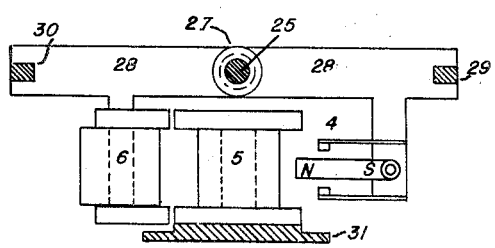
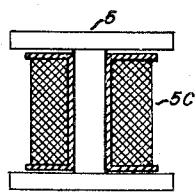
INVENTOR
Donald R. Putt,
BY
ATTORNEYS Oct. 11, 1949.　　　　D. R. PUTT　　　　2,484,049
ELECTRICAL CONTROLS
Filed April 22, 1939　　　　　　　　　　8 Sheets-Sheet 2
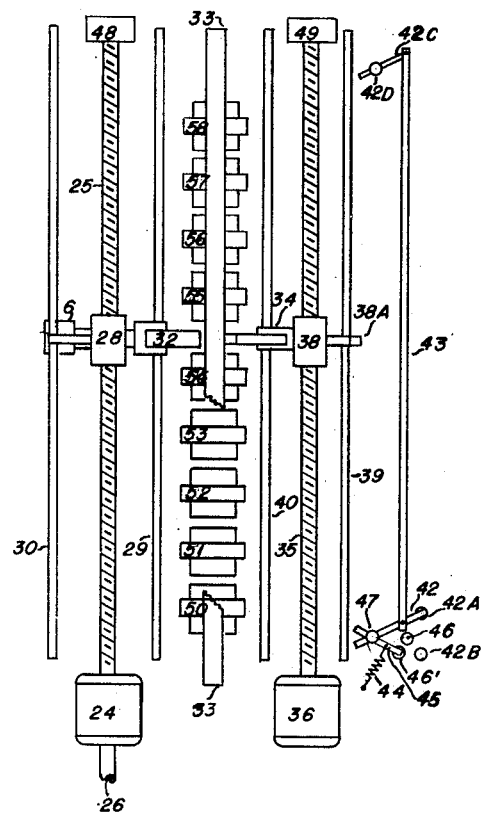
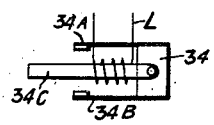
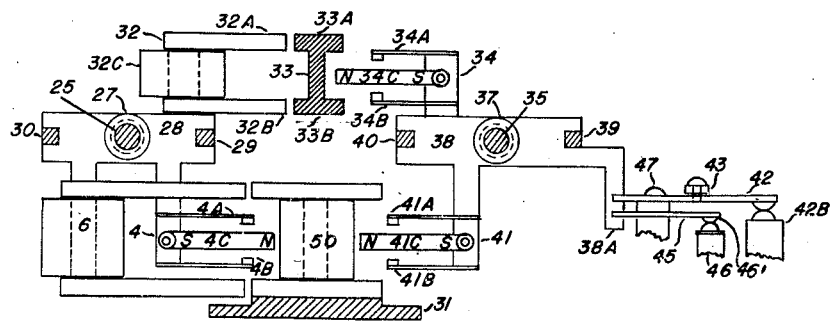
INVENTOR
*Donald R. Putt,*
BY *Hoguet, Neary & Campbell*
ATTORNEYS

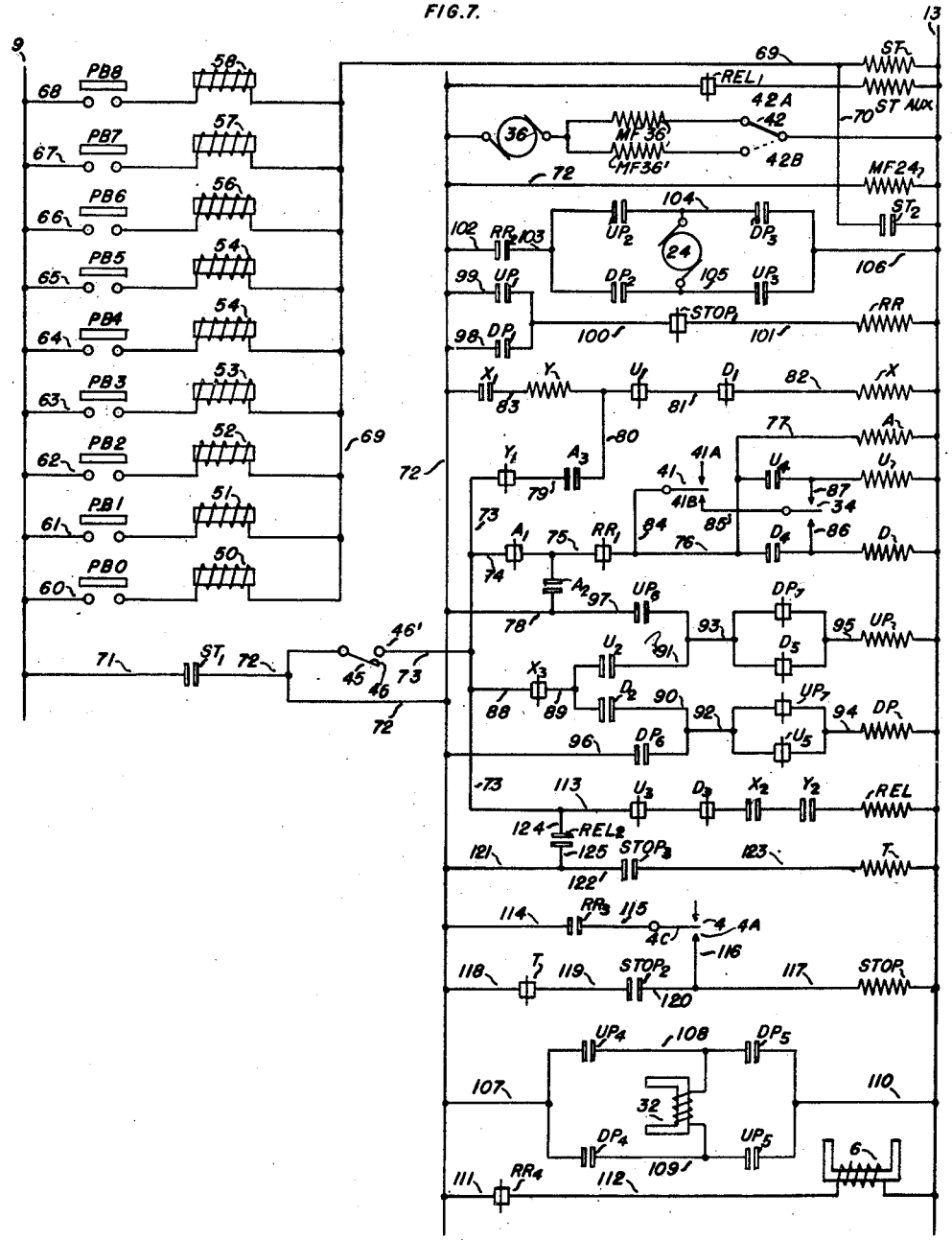

Oct. 11, 1949.    D. R. PUTT    2,484,049
ELECTRICAL CONTROLS
Filed April 22, 1939    8 Sheets-Sheet 4
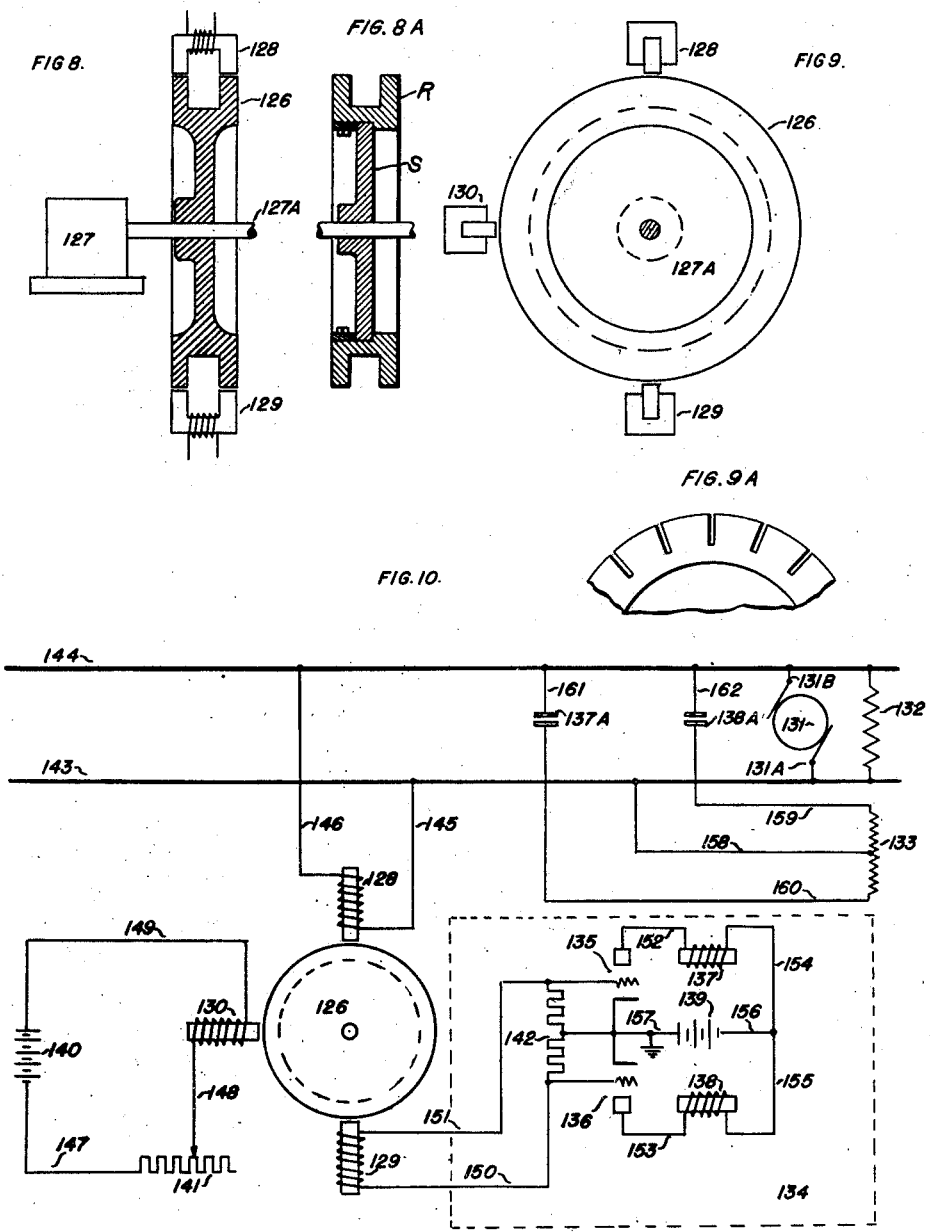
INVENTOR
Donald R. Putt,
BY
ATTORNEYS Oct. 11, 1949.  D. R. PUTT  2,484,049
ELECTRICAL CONTROLS Filed April 22, 1939  8 Sheets-Sheet 5

INVENTOR
*Donald R. Putt,*
BY
ATTORNEYS

Oct. 11, 1949.　　　D. R. PUTT　　　2,484,049
ELECTRICAL CONTROLS
Filed April 22, 1939　　　8 Sheets-Sheet 6
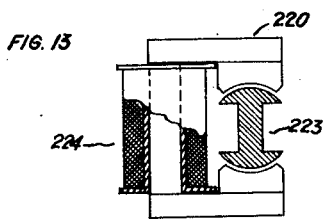
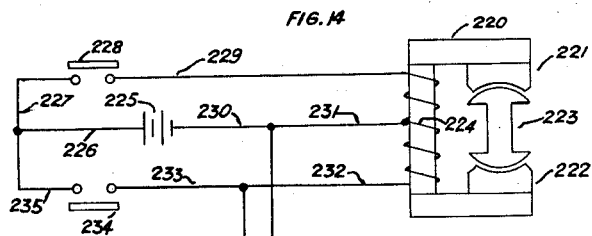
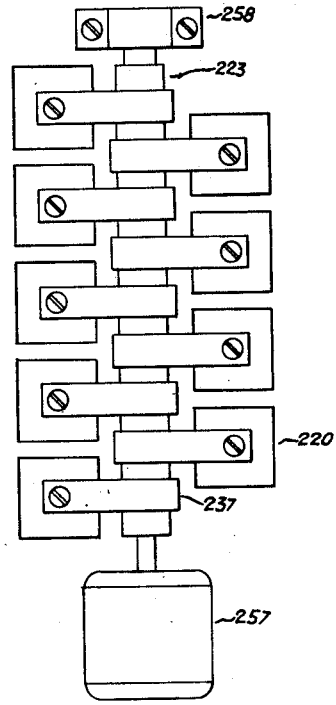
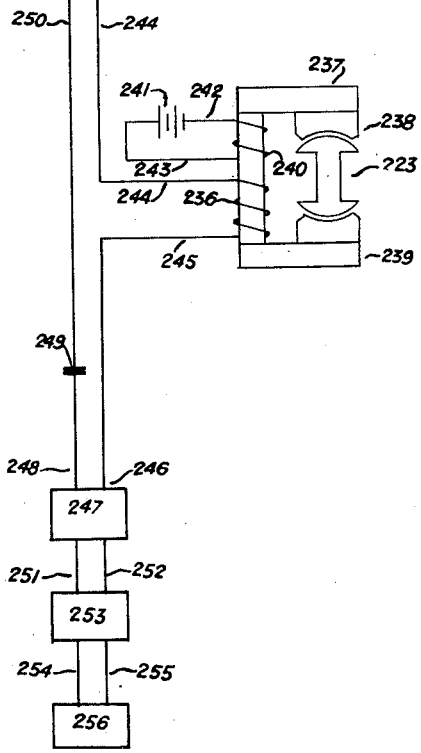
INVENTOR
*Donald R. Putt,*
BY
ATTORNEYS

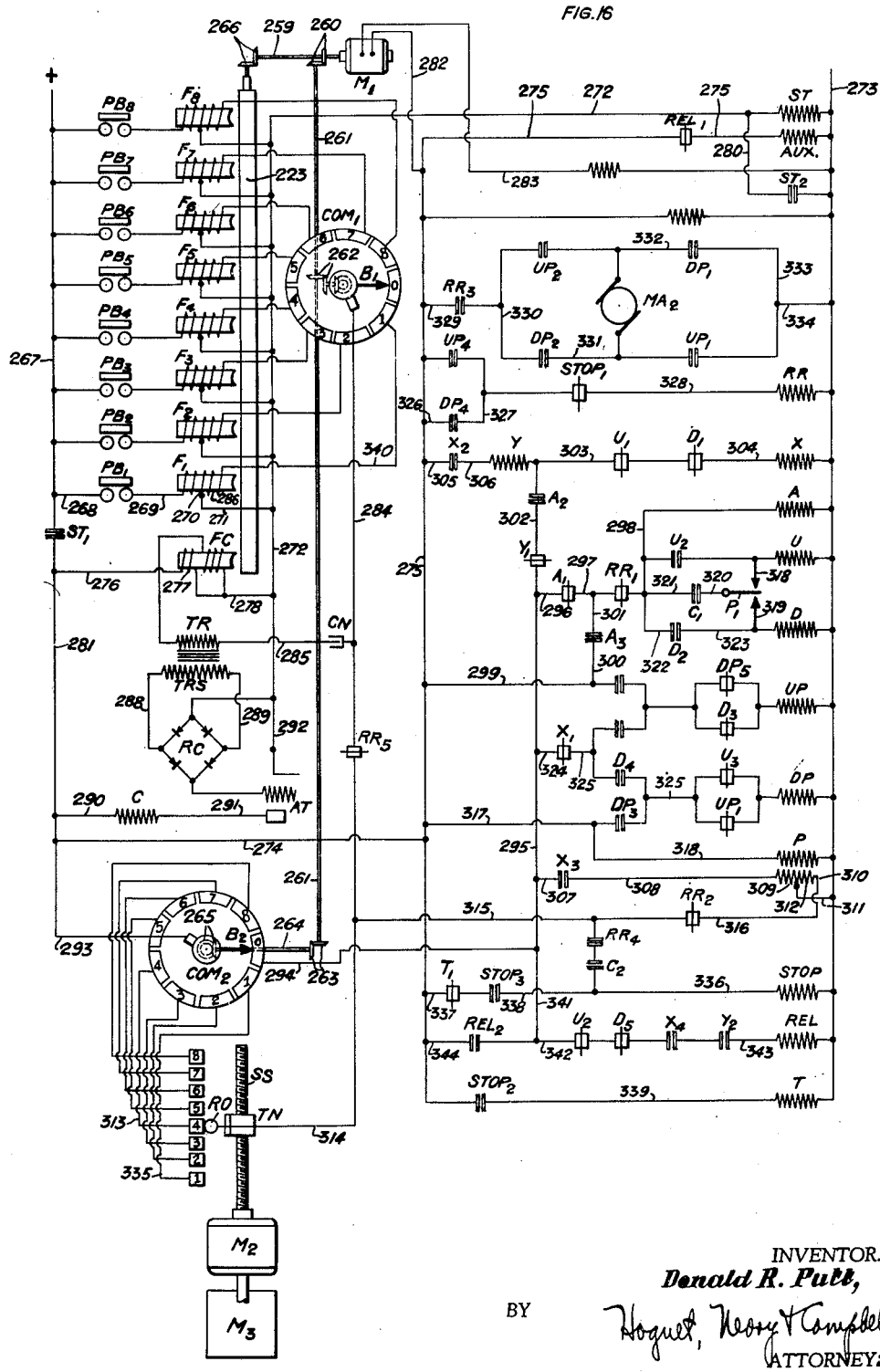

Oct. 11, 1949.    D. R. PUTT    2,484,049
ELECTRICAL CONTROLS
Filed April 22, 1939    8 Sheets-Sheet 8
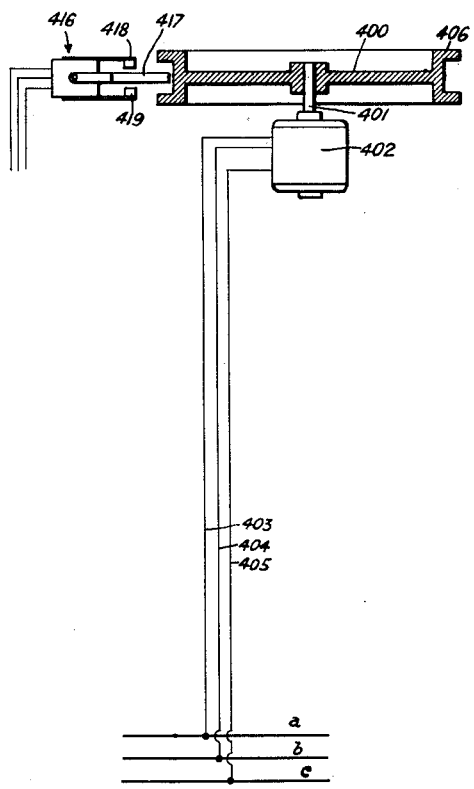
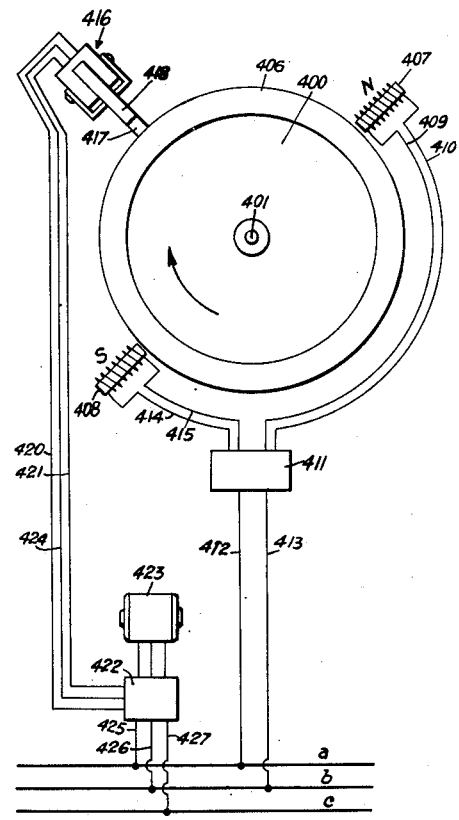
INVENTOR.
*Donald R. Putt,*
BY
ATTORNEYS

UNITED STATES PATENT OFFICE 2,484,049

ELECTRICAL CONTROLS

Donald R. Putt, Jersey City, N. J.

Application April 22, 1939, Serial No. 269,546

23 Claims. (Cl. 318—162)

My invention relates to electrical control systems. More specifically, my invention contemplates such a method and means in which the effects of electrical impulses are stored magnetically, and the magnetic storage utilized for effecting the control.

Heretofore, systems of integrating, directing or controlling have been extremely complicated and have required mechanical relays as the elements for storing the initiated current impulses; such systems also require extensive electrical circuits and mechanical switching means for accomplishing the desired control.

The relays used in such prior systems necessarily include a multiplicity of contacts, biasing springs, bearings and the like, such as found in conventional latching relays; these are relatively expensive, bulky in size and subject to the defects inherent in devices of this character. The frictional wear, due to the many moving mechanical parts, necessitates frequent and costly replacements. The effect of the initial impulse is retained mechanically in the relay and the magnetic effect is dissipated.

In a mechanical storage means used in such prior art control systems such as a latching relay, an undesirable time lag is also present. This is due to the fact that the movement of the armature, latching means, and contact elements involves a time factor and necessitates overcoming the inertia of the parts to be moved. Such a time lag is also caused by the fact that sufficient magnetism must be built up in the relay after the flow of the current is initiated before the armature and contacts can be operated to effect any control.

Associated with each relay is a secondary electrical circuit which is set up by the operation of the relay. Prior art control systems also require a selector mechanism that determines which of the mechanically stored impulses are to be used in controlling the operation. The selector is mechanically and electrically separated from the relays and operates on these secondary electrical circuits which transmit the effects of the various actuated and unactuated relays to the selector mechanism. This selector also involves complicated switching mechanism and due to its mechanical nature and the necessity for electrical contacts with the circuits leading from the relays, it can make only a limited number of contacts and its function and mode of operation is greatly limited if prohibitive wear is to be avoided.

In accordance with the invention, however, the storage of the initiating impulse is accomplished without the necessity of any moving parts, and the effect of the impulse remains stored in an inert state as magnetic flux, always ready to exercise its controlling function. The storage of the initiated impulse, therefore, involves no moving parts which can get out of order or wear. Also in accordance with my invention, the storage of an initiating impulse is effected immediately, without an appreciable time lag, because there is no inertia of moving parts to be overcome. In addition, there is no necessity of building up a magnetic flux before the controlling operation can be exercised.

My invention also makes it possible to eliminate the selector mechanism of the prior art and the secondary circuits, because the scanning means is actuated by the stored magnetic flux. The scanning means, being electromagnetically actuated by the stored magnetic flux, does not make any mechanical or electric contact with the storage means during the scanning operation. This enables an unlimited number of scanning operations to take place repeatedly or continuously without any wear on the parts involved, and at high speed. The control can be determined in relation to the condition of all of the storage units, and by means of my invention the storage means and the means for achieving the control can be combined in a single unit.

The apparatus embodying my invention has fewer parts, and can be made more compact and materially reduced in size, while at the same time enabling more readily the control of more complicated functions and operations than has been possible heretofore.

Viewing the present invention in its broadest aspects, it comprises the combination of steps and means in which impulses are produced either intermittently or by variations in a continuous impulse, which correspond to the respective functions and operations of the process or apparatus which it is desired to control. These impulses are used to set up magneto-motive forces for magnetizing storage means in which magnetic flux is adapted to be stored or retained in an inert state for any desired period of time. The stored magnetic flux is subsequently utilized to achieve the desired control which may be at a predetermined and selected time, after which the storage means may be restored to its initial or any other desired magnetic state.

In some applications of my invention it may be desirable to modify the effect of the stored impulse, and to employ the resultant effect of the modification to achieve the control. It may also be desirable to induce a voltage from the magnetic flux stored in the storage means which voltage can be modified or compared with a standard voltage and the resultant or compared voltage may be employed to achieve the control.

A process to be controlled as well as its functions may include, for example, such factors as time, temperature, pH value, rate of operation or flow, pressure, etc. An apparatus to be controlled may be any having moving parts, the movement of which is to be controlled.

It will be evident that many different types of apparatus and operations will be suitable for practicing each of many various steps of the method set forth above. Accordingly, it will be desirable to consider briefly possible combinations of methods and apparatus for effecting the particular steps set forth in the method, before describing specific embodiments in detail.

*Initiating methods and elements.*—The impulses whose effects it is desired to store may be initiated by moving a magnetized body into inductive relationship with a storage element. Generally however, the impulses are made by circuit making or breaking devices, or by variations in current.

The source of voltage may be any generator or battery, and the circuit interrupting element may be a push-button, switch, relay or even a combination of these. Current impulses may also be created by a photoelectric cell. Pick-up coils may also provide current impulses by change of the magnetic flux linking the coil.

Variations in continuous currents may also be used to provide the impulses. In general, all devices for producing a change of current may be used for creating impulses whose effects may be magnetically stored in accordance with the invention.

*Magnetic storage means.*—The effects of the initiated electrical current may be most stored magnetically by passing the initiated current through an electromagnet having a hard steel core, which has the property of retaining a certain amount of magnetism after the initiating current ceases to flow.

If desired, the hard steel core may be magnetized by an electromagnet having a soft iron core placed in inductive relationship with it. The energizing electromagnet may be maintained in a fixed position, or movable to energize a series of hard steel cores.

A number of hard steel cores may be used to store a plurality of current impulses. A multiple storage unit may comprise, for example, a steel disc provided with a plurality of teeth or slots about its periphery which are adapted to be magnetized selectively by means of an electromagnet mounted for relative movement.

A rotating disc without teeth may be used, and the magnetic storage effected will depend upon the magnitude and direction of the current flowing through the energizing electromagnet. If a continuous current is used to excite the electromagnet, the entire periphery thereof will be magnetized of one polarity, but with different amounts of flux depending on the current. The electromagnet may be brought into and out of relation with the disc by moving either and thus portions of the disc may be magnetized.

*Means for modifying stored magnetic flux.*— In certain types of control it may be desirable to increase or decrease the magnetic flux stored or reverse its polarity before or after it has been used to effect the control. This may be accomplished by applying a second magnetizing force to accomplish the desired modification. The flux may also be modified by heat or shock.

Apparatus may be provided for measuring the stored magnetic flux and for actuating the modifying magnetic means, causing it to modify the magnetic flux stored as may be desired by the operator, or by a predetermined value or pattern, which may be produced by a group of storage means of any type, or as the function of the thing being controlled. This also may be accomplished by providing a searching device sensitive to magnetic flux such as a polarized contactor, a pickup coil, or a chemical sensitive to magnetic flux, which initiates a secondary current impulse which may be amplified, if desired, and compared with a predetermined pattern or value. The secondary current may be compared to the predetermined current pattern before the former current is amplified. The resultant current may then be applied to a modifying magnetic means.

The modification of the flux stored in a plurality of storage elements may be accomplished by magnetic means movable from one storage unit to another which may be driven synchronously or any other relation with either the modifying means or the process or apparatus being controlled. The modifying magnetic means may be energized either before or after being brought into inductive relationship with the storage core to be modified.

Where the storage means comprises a rotating disc, the modification of the stored magnetic flux may be effected by a modifying magnetic means which is adapted to be energized selectively from a plurality of current initiating means and a commutator may be utilized for the purpose.

*Scanning means for utilizing magnetic flux storages to provide control impulses.*—The magnetic flux stored is used to obtain impulses for effecting the desired control. These impulses may be either mechanical or electrical. This operation will be designated "scanning." The magnetic flux may induce a voltage. The induced voltage may be amplified or it may be used directly to effect the desired control. The changes in flux to induce a voltage may be produced either by moving the coil or by producing variations in the flux stored therein, for example, by varying the reluctance of the magnetic circuit of the storage core. Polarized contactors may also be utilized to make or break a circuit, creating an impulse which is utilized to effect the control.

Where it is desired to adjust the polarity of the polarized contactor the armature may be made of soft iron on which an energizing coil is adapted to be wound. This provides a scanning means in which either the polarity or magnitude of the magnetic polarizing flux or both may be adjusted from a remote point. The control may also be achieved by mechanical means responsive to the polarized element, as distinguished from current impulses.

Certain chemical oxides such as those of tellurium and bismuth are sensitive to magnetic flux. By bringing elements comprising said such oxides into the magnetic flux, changes occur which may be utilized to provide impulses for effecting any desired control.

The controlling current impulses may be provided by moving an electromagnet through the magnetic field of the storage means to induce a voltage. A pickup coil without a core may be used.

Voltages may also be induced in a stationary pickup coil by causing the magnetic flux in the storage means to vary, such as by varying the reluctance of the magnetic circuit of the storage means.

The polarized contactor described above may be further modified by providing an armature including a hard steel core and an energizing winding thereon. This polarized contactor will operate in the same manner as the permanent magnet armature, and by a current of opposite direction the magnetic polarity of the polarizing armature may be adjusted. The scanning device may be mounted for relative movement with respect to the storage means, such as on a travelling nut driven by a lead screw, or a rotating shaft, or a reciprocating crank, or the like.

The invention may be better understood from the following detailed description of several embodiments taken in conjunction with the accompanying drawings in which:

Fig. 1 is a schematic drawing illustrating broadly the principles on which the present invention is based;

Fig. 2 is a schematic drawing of an electrical control system constructed in accordance with the invention;

Fig. 3 is a sectional view along line 3—3 of Fig. 2;

Fig. 4 is a sectional view of a storage element;

Fig. 5 is a schematic representation illustrating the application of the invention to position controls such as are used in gun or elevator controls;

Fig. 6 is a sectional view along line 6—6 of Fig. 5;

Fig. 6a shows a modified polarized switch;

Fig. 7 is a schematic drawing of the electrical circuits of the position control illustrated in Figs. 5 and 6;

Fig. 8 is a sectional view of a modification employing a disc storage element;

Fig. 8a is a view in section of an alternative form of the disc construction;

Fig. 9 is a side view in elevation of the storage element illustrated in Fig. 8;

Fig. 9a is a view in part in plan of a further alternative form of the disc construction;

Fig. 10 is a circuit diagram utilizing the storage element of Figs. 8 and 9 for controlling voltage;

Fig. 13 illustrates a modification of scanning means by varying the magnetic flux;

Fig. 14 is a schematic diagram illustrating an embodiment utilizing the storage means shown in Fig. 13;

Fig. 15 is a view in elevation illustrating a plurality of assembled storage means of the type shown in Fig. 13;

Fig. 16 is a schematic diagram of the electrical circuits based on Figs. 13, 14 and 15;

Fig. 17 is a side view partly in section, of a phase relay constructed in accordance with the invention;

Fig. 18 is a plan view of the phase relay of Fig. 17.

Figure 11:
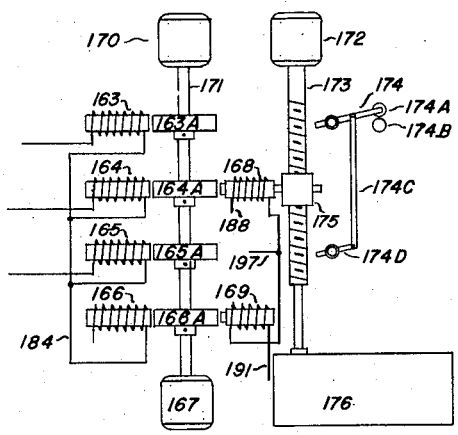
Fig. 11 is a schematic diagram of control apparatus constructed in accordance with the invention.

Referring to Fig. 1, a storage core is shown at 5, which is provided with an energizing winding 5C and having opposite pole pieces 5A and 5B.

The current impulse initiating element may be a push button 1 which, when depressed, closes a circuit from positive wire 9 through the wire 10, push button 1, wire 11, the upper part of magnetizing winding 5C and wire 12 to negative line 13 of the electrical supply. This causes current to flow through the winding 5C, creating a magnetomotive force therein whose magnitude depends on the magnitude of the current and whose direction depends on the direction of current flow. The magnetomotive force sets up magnetic lines of force in the core 5 such that the pole piece 5A, for example, will be a northpole and pole piece 5B will become a south pole.

Inasmuch as push button 1 is depressed only momentarily the current flows through the energizing winding 5C for only a short period of time and drops to zero when the push button 1 is released. Accordingly, the magnetomotive force previously set up in the magnetizing winding 5C drops immediately to zero. However, since the storage core 5 is made of material having a relatively high magnetic retentivity, it retains some residual magnetic lines of force and remains magnetized.

The amount of residual flux retained by the storage core 5 is determined by the physical properties of the ferromagnetic material used in its construction and also on the strength of the initiating current impulse. If the so-called hard varieties of ferro-magnetic material are used, such as chrome steel, tungsten steel, or molybdenum steel, for example, large amounts of residual magnetic flux will be retained. Where softer steels or iron are used the residual flux will be less, but in any case, some residual magnetic flux will be retained in the storage core. It will be evident that such a magnetic storage core provides an ideal impulse storing device, for once it has been magnetized, it will retain a certain quantity of residual magnetism for indefinite periods of time without any substantial change.

At any time after an impulse has been initiated by push button 1, the storage core 5 may be scanned by means of any suitable device responsive to either the magnitude or the polarity of a magnetic field. The scanning device may be a polarized switch 4, comprising a magnetized contactor 4C which is adapted to engage selectively either of two contacts 4A and 4B. The polarity of the contactor 4C may be such that it has a north pole indicated by letter N and a south pole indicated by letter S.

If the polarized switch 4 is now moved to a position between the pole pieces 5A and 5B of storage core 5, the contactor 4C, being a north magnetic pole, will be attracted toward pole piece 5B which is a south magnetic pole. This will close a circuit from the positive wire 9 through wire 19, polarized contactor 4C, contact 4B, wire 22, relay 8 and wire 23 to the negative line 13, energizing relay 8 and causing its armature 8' to engage contact 9'. The engagement of armature 8' and contact 9' completes a circuit to the motor 10' through a wire 11', contact 9' engaging armature 8' on relay 8, wire 12', a source of voltage 13' and wire 14', thus energizing motor 10', and causing it to effect a desired control of the apparatus 15', which may be a machine or apparatus for controlling a process. The circuit to the motor 10' will remain closed until the polarized contactor 4C is removed from its position between the pole pieces 5A and 5B of the storage core 5.

If now the push button 2 is actuated, a circuit will be completed from the positive wire 9, through wire 14, push button 2, wire 15, the lower half of the magnetizing winding 5C on storage core 5 and wire 12 to the negative line 13. The lower half of the winding 5C now being energized, magnetic flux of opposite polarity is set up in the storage core 5, so that the pole piece 5A is now a south magnetic pole, and pole piece 5B is a north magnetic pole.

If the polarized contactor 4C on polarized switch 4 is now moved between the pole pieces 5A and 5B on storage core 5, the contactor 4C being a north magnetic pole will be attracted toward the pole piece 5A, which is now a north magnetic pole, and it will engage contact 4A. This closes a circuit from the positive line 9 through wire 19, polarized contact 4C engaging contact 4A, wire 20, relay 7 and wire 21 to the negative line 13, thus energizing relay 7 and causing its armature 16' to engage contact 17'. A circuit is now closed to the motor 18', through a wire 19', contact 17' engaging armature 16' on relay 7, wire 20', a source of voltage 21' and a wire 22', thus energizing the motor 18' and causing it to effect a different control on the apparatus 15'.

If now it is desired to demagnetize the storage core 5 without again actuating the push button 1, this may be accomplished by moving a demagnetizing core 6 near the storage core 5 such that its pole pieces 6A and 6B are adjacent the corresponding pole pieces 5A and 5B of storage core 5. When push button 3 is depressed a circuit is closed from the positive wire 9, through wire 16, pushbutton 3, wire 17, demagnetizing winding 6C on core 6 and wire 18 to the negative line 13, causing current to flow through winding 6C and setting up in the demagnetizing core 6, a magnetic field opposite in direction to that existing in the storage core 5. The application of such a magnetic field to storage core 5 may restore it to the original demagnetized condition, or if desired, may reverse its magnetic polarity as suggested above.

The winding 6C of the demagnetized core 6 may also be connected to the positive wire 19 through polarized switch 4 in order that the polarity of storage core 5 may be reversed whether it be magnetized so that pole piece 5A is a north pole or a south pole.

If an impulse stored in the core 5 is desired to be erased, either because it was a mistake or because it is to be stored in another similar core, it can be erased by means of the core 6 or push button 2 before the scanning device 4 is permitted to be actuated by the storage. This method of erasing or connecting stored impulses before scanning may be applied in any of the more specific embodiments hereinafter described.

It will be evident that the above described apparatus and method constitutes a simple and novel electrical control system in which the number of moving mechanical parts is reduced to an absolute minimum. The described method and apparatus also permits a single polarized switch to coact with a plurality of storage cores 5, as will be apparent from the following description.

Apparatus for scanning a plurality of storage cores is shown schematically in Fig. 2. Here a plurality of storage cores are provided, 5A, 5B, 5C, 5D, 5E, 5F, 5G, and 5H, each corresponding to an operation to be performed by the mechanism 26, which may be a machine or apparatus for carrying out a process, and which may be driven by a motor 24 through shaft 25. Mounted on the shaft 25 is a travelling nut 27 on which is a carriage 28 having thereon a polarized switch assembly 4 and a demagnetizing core 6.

In operation the motor 24 drives the shaft 25 causing the carriage 27 to move past the storage cores 5A, 5B, 5C, 5D, 5E, 5F, 5G and 5H. If any of the storage cores 5A—5H are energized, the polarized switch 4 will make either of its two contacts as it passes each energized core, closing circuits to effect the desired control. After the desired control corresponding to each energized storage core has been effected, a demagnetizing field, of such magnitude and direction as either to reduce the residual magnetism to zero or to magnetize the cores in the opposite direction, may be applied to it by demagnetizing core 6.

The apparatus and method described in Figs. 5, 6 and 7 may be applied to great advantage in the control of various types of processes and apparatus in which operations or movements are to be performed in a desired order after initiating impulses are given corresponding to the desired operations or movements. The apparatus shown in these figures is conveniently illustrated as applied to electrical position controls such as are used for positioning an elevator or a gun in accordance with a predetermined schedule. In such controls it is required to move the apparatus to be controlled in a given manner or to any one of a group of predetermined positions where it may be brought to rest in order to carry out other necessary operations, such as loading a gun in gun control or opening doors and loading an elevator as in elevator control, for example.

Referring to Figs. 5 and 6, a plurality of storage cores 50, 51, 52, 53, 54, 55, 56, 57 and 58 are shown, each of which corresponds to a position to which an element 26 to be controlled may be moved. The control element 26 may be driven to any one of the positions represented by the storage cores 50–58 by means of a motor 24 which drives a lead screw 25 on which a movable carriage 28 is mounted. It will be evident that the position of the movable carriage 28 along the lead screw 25 will be proportional to the position of the controlled element 26.

The cores 50–58 inclusive are adapted to be energized by impulses initiated when the push buttons PB0, PB1, PB2, PB3, PB4, PB5, PB6, PB7, and PB8 are depressed, as shown in Fig. 7. As each push button is pressed the corresponding storage core is connected across the voltage supply and is magnetized as described above in connection with Fig. 1.

Secured to the movable carriage 28 is a polarized switch 4 (Fig. 6) whose magnetized contactor 4C is adapted to engage either contact 4A or 4B, depending on the magnetic polarity of the storage cores 50–58. A demagnetizing core 6 is also mounted on the carriage 28 for demagnetizing the storage cores 50–58 after each operation has been performed. The pole pieces 6A and 6B of the demagnetizing core 6 are mounted so that they move closely adjacent the corresponding pole pieces of the storage cores 50–58 as the carriage 28 is moved longitudinally along lead screw 25 in response to the motor 24.

In order that electrical position controls of this character may function properly, it is necessary that they be able to determine whether an operation to be performed in the future in response to an initiating impulse from one of the push buttons PB0–PB8 is above or below the present position of the controlled element 26. This is provided for in the present embodiment by an elongated rod 33 preferably made of material having a high magnetic retentivity which is mounted parallel to the row of cores 50–58. As shown in Fig. 6, the rod 33 is provided with opposite pole pieces 33A and 33B which are adapted to be magnetized by corresponding pole pieces 32A and 32B on a magnetizing core 32 mounted on the movable carriage 28.

The energizing winding 32C of magnetizing core 32 is adapted to be energized by current flowing in one direction during the time that the carriage 28 is moving upwardly, and is adapted to be magnetized by current flowing in the reverse direction when the carriage 28 is moving downwardly. Thus, assuming that the carriage 28 is moving downwardly from its position shown in Fig. 5, the rod 33, down to the region where the pole pieces 32A and 32B of magnetizing core 32 are adjacent its corresponding pole pieces 33A and 33B will be magnetized such that, for example, pole piece 33A is a north pole and pole piece 33B is a south pole.

The portion of the rod 33 below the present position of the magnetizing core 32 will however, still be magnetized from the previous upward trip of carriage 28, so that in this region, pole piece 33A will be a south pole and pole piece 33B will be a north pole. Accordingly, the path of travel of carriage 28 is divided into two zones, such that the zone above its present position is magnetized at of given polarity and the zone below its present position is magnetized of the reverse polarity.

As disclosed in connection with Fig. 1 above, the storage cores 50–58, energized by initiating impulses from the corresponding push buttons PB0–PB8, are adapted to be scanned by a scanning device of the polarized contactor type described above, which closes circuits affecting the operation of the controlled element 26, depending upon the magnetic condition of each of the cores 50–58 when the scanning device moves past it.

The scanning device may comprise a movable carriage 38 mounted on a lead screw 35 driven by a motor 36. The carriage 38 is provided with a projecting cam portion 38A which is adapted to engage mechanical limit switches placed at the upper and lower limits of travel of the carriage 38. These limit switches serve to reverse the direction of rotation of motor 36, provided it is energized, so that the carriage 38 will oscillate periodically between its upper and lower limits of travel.

The lower limit switch may comprise a lever arm 42 pivoted at 47 and provided with a contact which is adapted to engage contact 42A when the carriage 38 reaches its lower limit of travel. At the upper limit of travel of carriage 38, its cam 38A is adapted to engage a lever 42C pivoted at 42D which carries a link 43 secured to lever 42 of the lower limit switch. The actuation of lever 42C by cam 38A causes contact 42A to engage contact 42B, closing circuits affecting the operation of motor 36 as described in greater detail below.

As the movable carriage 38 reaches its lower limit of travel, its cam 38A engages a lever arm 45 also pivoted at point 47. The lever arm 45 carries a contact 46' which is normally maintained out of engagement with a contact 46 by means of a biasing spring 44. The carriage 38 at its lower limit of travel moves the lever arm 45 against the tension in spring 44, engaging contacts 46 and 46' and closing circuits associated with the control system as described hereinafter.

Secured to the scanning carriage 38 is a polarized switch 34 (Fig. 6) provided with a polarized contact 34C which is adapted to be moved between the pole pieces 33A and 33B of the magnetized rod 33. Depending on the polarity of the pole pieces 33A and 33B the polarized contactor 34C is adapted to engage either contact 34A or 34B for preparing circuits to control the operation of the controlled element 26, as described in greater detail below.

In some cases it may be desirable to make the magnetic polarity of the polarized contactor adjustable. This may be accomplished by providing a winding L on the contactor 34C, as shown in Fig. 6A. The magnetic polarity of the polarized contactor may be readily changed by controlling the magnitude and direction of the current flowing through coil L. If the contactor 34C is made of soft steel, it will be necessary to maintain a continuous flow of current in the winding L. By using a hard steel core, however, a single current impulse in the winding L will be sufficient to magnetize it of the desired polarity.

The scanning carriage 38 also carries a second polarized switch 41 which scans the storage cores 50–58, inclusive, as the scanning carriage 38 oscillates between its upper and lower limits of travel. The polarized switch 41 is provided with a polarized contact 41C which is adapted to engage either contact 41A or 41B, depending on the polarity of the respective pole pieces A and B of the storage cores 50–58. As the polarized switch 41 moves past an energized storage core it initiates a current impulse which actuates apparatus for controlling the controlled element 26 in accordance with the operation represented by the storage core scanned at that instant.

The circuits for controlling the apparatus shown in Figs. 5 and 6, and described above, are illustrated in Fig. 7. These circuits transmit initiated impulses to the storage cores, and prepare the necessary circuits for controlling the operation of motor 24 in response to the scanning device.

Let it be assumed for the sake of simplicity that the system is at rest, and that movable carriage 28 is at rest between storage cores 54 and 55. The controlled element 26, accordingly, will be at rest between the two positions corresponding to storage cores 54 and 55. At this point it is desired to have controlled element 26 move to the position corresponding to storage core 50. Accordingly, push button PB0 is momentarily operated for this purpose.

This causes current to flow from positive line 9 through wire 60, push button PB0, storage core 50, wire 69, through the winding of relay ST to the positive line 13. The impulse of current magnetizes storage core 50, and energizes relay ST, closing its contacts $ST_1$ and $ST_2$ and causing current to flow from positive line 9 through wire 71, contact $ST_1$, wire 72, motor armature 36, field winding MF36, and switch 42 to the negative line 13. A circuit is also closed from wire 72 through closed contact $REL_1$, auxiliary winding $ST_{aux}$ on relay ST, to negative line 13 so that relay ST remains energized after push button PB0 is released.

Motor 36 being energized now drives carriage 38 upwardly on lead screw 35 until cam 38A engages upper limit switch lever 42C. This causes lower limit switch contact 42 to engage contact 42B which energizes the oppositely wound motor field MF36' and deenergizes motor field MF36.

The motor drift or inertia may be utilized to actuate switch lever arm 42.

The energizing of motor field winding MF36' causes motor 36 to reverse its direction of rotation and drive carriage 38 downwardly until cam 38A again actuates switch lever 42, breaking contacts 42 and 42B, and making contacts 42 and 42A. Thus the carriage 38 scans or searches all of the storage cores 50–58 representing positions served by the controlled element 26 or carriage 28, as it oscillates between the extreme limits of its travel. This searching is continually repeated until machine 26 serves all positions of corresponding storage cores in which impulses of a given polarity have been stored.

It is apparent that the searching method can be modified so that carriage 38 will search only once each time motor 24 is stopped at a position. However, carriage 38 has been described as running continuously for the sake of simplicity.

At the lower limit of travel of carriage 38, cam 38A also actuates switch lever arm 45, maintaining contacts 46 and 46' closed while carriage 38 is reversing at this point. This causes current to flow from line 9 through wire 71, contact $ST_1$, wire 72, switch lever 45, contacts 46 and 46', wire 73, wire 74, normally closed contact $A_1$ on relay A, wire 75, closed contact $RR_1$ on relay RR, wire 76, wire 77, and relay A to the negative line 13, energizing relay A, closing its contacts $A_2$ and $A_3$ and opening contact A'. The closing of contact $A_2$ causes current to flow from wire 72 through wire 78, closed contact $A_2$ on relay A, wire 75, contact $RR_1$ on relay RR, wire 76, wire 77, and relay A, thus causing relay A to remain energized until relay RR is energized.

Current also flows, as long as switch 45 is closed, from wire 73 through normally closed contact $Y_1$ on relay Y, wire 79, closed contact $A_3$ on relay A, wire 80, closed $U_1$ contact on relay U, wire 81, closed contact $D_1$ on relay D, wire 82, and relay X to the negative line 13, thus energizing the X relay, closing its contacts $X_1$ and $X_2$ and opening contact $X_3$. The closing of contact $X_1$ on relay X prepares a circuit for energizing the Y relay through wire 83. However, the Y relay will not be energized until the carriage 38 permits lower limit switch contacts 46 and 46' to open by reason of the tension in spring 44. When the carriage 38 begins to move upwardly and contacts 46 and 46' are opened, the Y relay, is energized by current flowing from wire 72 through contact $X_1$ on relay X, wire 83, relay Y, normally closed contact $U_1$ on relay U, wire 81, normally closed contact $D_1$ on relay D, wire 82, and relay X to the negative line 13, thus keeping relays X and Y energized until either the U or D relays are energized. The Y relay when energized closes its contact $Y_2$ and opens contact $Y_1$, breaking the circuit to the X relay at wire 79.

Preparations have now been completed so that polarized switch 41 may determine and relay as it passes each storage core, a current impulse to either of the U or D relays. Polarized switch 34 scans the position storage bar 33 in order to determine whether the relayed impulses from polarized switch 41 are from storage cores above or below the present position of the carriage 28 or controlled element 26.

As carriage 38 is driven upwardly, polarized switch 41 will remain in a neutral position by a biasing spring (not shown) until it passes one of the storage cores 50–58 which is magnetized, when it will be operated according to polarity of the residual flux in the storage core. Thus as polarized contact 41C passes magnetized core 50, it will engage contact 41B because of the polarity of core 50. This causes current to flow from wire 72, through wire 78, closed contact $A_2$, wire 75, closed contact $RR_1$, wire 84, polarized contactor 41C, contact 41B, wire 85, polarized contact 34C, or contact 34A, wire 86, and relay D winding to negative line 13. D relay is thus energized, closing its contacts $D_2$ and $D_4$ and opening contacts $D_1$, $D_3$ and $D_5$. The closing of contact $D_4$ causes current to flow from wire 75, through closed contact $D_4$, and relay D, so that relay D remains energized when polarized switches 41 and 43 are opened.

It should be noted here that bar 33 has been previously magnetized so that it has one polarity from the present position of carriage 28 to the lower limit of travel, and the reverse polarity from the present position of carriage 28 to the upper limit of travel. Thus when polarized contact 34C is above the present position of carriage 28, it engages contact 34A completing a circuit from wire 85 to 86. Correspondingly, when polarized contact 34C is below the present position of carriage 28, it engages contact 34B, closing a circuit from wire 85 to wire 87.

The D relay being energized, its contact $D_1$ is opened and the circuit between wire 81 and wire 82 is broken, thus deenergizing relays X and Y so that contacts $X_1$, $X_2$ and $Y_2$ are opened, and contacts $X_3$ and $Y_1$ closed. This prepares the circuit between wire 88, and wire 89, and also breaks the circuit of the REL relay at wire 113. Carriage 38 meanwhile completes its trip and returns to its lower limit of travel where its cam 38A closes contacts 46 and 46' causing current to flow from wire 72, contacts 46 and 46', wire 73, wire 88, closed contact $X_3$ of deenergized relay X, wire 89, closed contact $D_2$ of energized relay D, wire 90, wire 92, through closed contacts $UP_7$ and $U_5$ of relays UP and U respectively, wire 94, and relay DP winding to negative line 13.

Relay DP is thus energized, and its contacts $DP_1$, $DP_2$, $DP_3$, $DP_4$, $DP_5$, $DP_6$ are closed and contact $DP_7$ is opened. The closing of contact $DP_6$ causes current to flow from wire 72, through wire 96, closed contact $DP_6$ on relay DP, wire 92, contacts $UP_7$ and $U_5$ on relays UP and U respectively, wire 94, and relay DP to the negative line 13, thus causing DP relay to remain energized until both the UP and U relays are energized, or the ST relay is deenergized.

The closing of contact $DP_1$ causes current to flow from wire 72 over wire 98, contact $DP_1$ on relay DP, wire 100, closed contact $STOP_1$ on relay STOP, wire 101, and relay RR to negative line 13, thus energizing the RR relay. Likewise a circuit is closed from wire 72, through wire 107, contact $DP_4$ on relay DP, wire 109, electromagnet 32, wire 108, contact $DP_5$ on relay DP, and wire 110, to negative line 13, thus energizing electromagnet 32 of such polarity that as it progresses along bar 33 it will magnetize bar 33 so as to satisfy the direction selection function outlined above.

Relay RR, being energized, closes its contacts $RR_2$ and $RR_3$ and opens contacts $RR_1$ and $RR_4$. The closing of contact $RR_2$ causes current to flow from wire 72 through wire 102, closed contact $RR_2$ on relay RR, wire 103, contact $DP_2$ on relay DP, wire 105, motor 24, wire 104, closed contact $DP_3$ on relay DP, and wire 106 to negative line 13, causing motor 24 to rotate in the proper direction to drive carriage 28 toward storage core 50. At the same time, normally closed contact RR₁ on relay RR is opened, thus deenergizing the A and D relays. Normally closed contact RR₄ on relay RR is also opened, breaking the circuit to electromagnet 6 between wires 111 and 112.

The energization of the RR relay prepares the circuit at wire 115 so that when the polarized switch 4 passes through the magnetic field of an energized storage core of the proper polarity to indicate a stop, it will operate to stop the carriage 28 at this position. Thus, when carriage 28 arrives at storage core 50, polarized contactor 4C will engage contact 4A, causing current to flow from wire 72, through wire 114, closed contact RR₃ on relay RR, wire 115, polarized contact 4C, contact 4A, wire 116, wire 117, and relay STOP to negative line 13, thus operating the STOP relay.

Contacts STOP₁ on the STOP relay open, breaking a circuit at wires 100 and 101, thus deenergizing the RR relay. This opens contact RR₂ on relay RR between wires 102 and 103, breaking the circuit feeding the armature of motor 24 and causing carriage 28 to stop. Contact STOP₂ on relay STOP closes, completing a circuit at wires 119 and 120, and causing current to flow from wire 72, through wire 118, closed contact T, wire 119, closed contact STOP₂ on relay STOP, wire 120, wire 117, and relay STOP to negative line 13, holding relay STOP energized until the time interval relay T operates.

The closing of contacts STOP₃ on relay STOP causes current to flow from wire 72, through wire 121, wire 122, contact STOP₃ on relay STOP, wire 123, and relay T to negative line 13, thus energizing the time delay relay T.

Inasmuch as contact RR₄ on relay RR is now closed, a circuit is completed from wire 72, through wire 111, closed contact RR₄ on relay RR, wire 112, and the winding of electromagnet 6 to negative line 13, thus energizing electromagnet 6 in such manner as to demagnetize the core 50 and remagnetize it of opposite polarity, indicating that this position has been served. Moreover, since contact RR₁ on relay RR is now closed, a circuit is prepared at wires 75 and 76, which is completed when carriage 38 again closes contacts 46 and 46' at its lower limit of travel. This circuit energizes relay A, which in turn completes the circuit between wires 79 and 80, energizing the X relay. As the carriage 28 again moves upwardly, disengaging contacts 46 and 46', relay Y is also energized by current flowing from wire 72, contact X₁, wire 83, relay Y, contact U₁, wire 81, contact D₁, wire 82, and relay X to negative line 13.

Since both the X and Y relays are energized, a circuit is prepared from wire 113 to negative wire 13. If carriage 38 completes its trip and finds no storage cores energized, relays U or D will not be energized so that this circuit will not be broken. Hence, when carriage 38 again reaches its lower limit of travel, contacts 46 and 46' will be brought into engagement causing current to flow from wire 72, through contacts 46 and 46', wire 73, wire 113, closed contact U₃ on relay U, closed contact D₃ on relay D, closed contact X₂, closed contact Y₂, and relay REL to negative line 13, thus energizing release relay REL, closing contact REL₂ and opening contact REL₁. Closed contact REL₂ on relay REL completes a circuit at wires 124 and 125 keeping relay REL energized after contacts 46 and 46' have become disengaged. At the same time, normally closed contact REL₁ on relay REL opens the circuit to the auxiliary winding ST_aux on relay ST, opening its contacts ST₁ and ST₂ and restoring the system to the normal position as shown.

In this description, it is assumed that the time required for carriage 38 to make a round trip between its upper and lower limits of travel is less than the time interval between the energization of relay T and its operation. If a call is registered from PB3 before the T relay operates and after it has been energized a different manner of operation obtains, as is indicated below.

Going back to the point where the T relay is just about to operate, let us assume that storage core 53 is energized by momentarily depressing push button PB3. The A relay has been previously energized, and it in turn has energized relay X. Accordingly, polarized contactor 41C is electrically connected to wire 72 which is connected to positive line 9. As carriage 38 passes energized core 53 in its upward travel, polarized contact 41C will engage contact 41B, connecting wires 84 and 85 and energizing polarized contact 34C. By reason of the residual magnetism in rod 33, polarized contact 34C will be in engagement with contact 34A, which completes the circuit through relay U to negative line 13, thus energizing relay U, closing contacts U₂ and U₄ and opening contacts U₁, U₃ and U₅.

The closing of contact U₄ connects the relay U directly to the wire 76 so that relay U remains energized after polarized contact 41C has returned to its neutral position. The opening of contact U₃ breaks the circuit to the relay REL between wire 113 and negative line 13, thus preventing relay ST from being deenergized by relay REL as would normally occur. When carriage 38 returns to its lower limit of travel, contacts 46 and 46' are again closed, causing current to flow from wire 73, through wire 88, closed contact X₃ on relay X, which was previously deenergized when U was energized, wire 89, closed contact U₂ on relay U, wire 91, wire 93, closed contact D₅ on relay D, wire 95, and relay UP to negative line 13, thus energizing relay UP, closing contacts UP₁, UP₂, UP₃, UP₄, UP₅, UP₆, and opening contact UP₇.

Inasmuch as both relay UP and relay U are now energized, contacts UP₇ and U₅ are open and the circuit is broken between wires 92 and 94, so that relay DP is deenergized. The closing of contacts UP₁, UP₂ and UP₃ reverses the circuit connections to motor armature 24. Likewise, the closing of contacts UP₄ and UP₅ reverses the current flow through the winding of electromagnet 32.

By this time the T relay has operated, opening contact T and breaking the circuit between wires 118 and 119, thus restoring the STOP relay to its deenergized position. The closing of contact STOP₁ completes the circuit between wires 100 and 101, which was previously prepared by the closing of contact UP₁ on relay UP, thus energizing relay RR, closing its contacts RR₂ and RR₃ and opening contacts RR₁ and RR₄. Contact STOP₃ is also opened, breaking the circuit between wires 122 and 123 and releasing the T relay.

The closing of contact RR₂ completes the circuit between wires 102 and 103 causing motor 24 to drive carriage 38 toward storage core 53. Normally closed contact RR₄ is opened, breaking the circuit between wires 111 and 112 and deenergizing electromagnet 6. The carriage 38 proceeds upwardly until its contact reaches storage core 53, when the magnetic field of core 53 causes polarized contact 4C to engage contact 4A, completing the circuit between wires 115 and 116 and energizing relay STOP. From this point on, the operation is the same as described in detail above.

In the event that carriage 38 completes a round trip between its upper and lower limits and no signal impulses have been stored, when it reaches the lower limit and contacts 46 and 46' are engaged, relay REL will be energized, which in turn will deenergize relay ST, thus causing the system to come to rest.

The operation of system has been described above for the case where a call initiated for a position below the present position of carriage 28 is answered after which either the system is shut down at core 50, or a call is initiated just after the carriage has arrived at core 50 but prior to shutting down the system. In the latter case the carriage after stopping at storage core 50 is driven to the later call at core 53.

Considered below is the case where a group of calls are initiated at various positions both above and below the present position of carriage 38. In these conditions, the apparatus is operated as a collective system, wherein all calls are collected to the highest point of travel at which point the machine reverses automatically and collects calls below its present position, which have been initiated after the machine passed these later initiated positions.

It will be noted upon examination of the circuits illustrated in Fig. 7 that as carriage 38 scans or searches the storage cores with its polarized contact 41C, the first round trip made by the carriage 38 determines whether there are calls above or below its present position. If, during its initial searching period, the polar contact encounters a call lying below and a call lying above the present position of carriage 28, both the U and D relays will be energized. Hence, when carriage 38 again reached its lower limit of travel current would be supplied over wire 88, closed contact X3 on relay X, wire 89, $U_2$ and $D_2$ contacts on relays U and D respectively, wires 90 and 91 respectively, wires 92 and 93 respectively, wires 94 and 95 respectively, and UP and DP relays respectively to negative line 13. In this case the faster relay would operate and would open the circuit for the other relay. Let us suppose that relay UP is the faster, and it breaks the circuit between wires 92 and 94 so that relay UP remains energized and relay DP is not.

If the carriage 38 is in the position shown in Fig. 5, between storage cores 54 and 55, and initiating impulses from push buttons PB1, PB2, PB6 and PB7 were stored, the control circuits would act to send the carriage 28 upwardly seeking calls. Polarized contact 4C would not be actuated until it entered the magnetic field of storage core 56, when it would engage contact 4A, thereby completing circuits for stopping storage core 56. While carriage 28 remained at rest adjacent core 56, polarized contacts 41 and 34 would scan or search all the core to determine if any other calls were stored above this position of carriage 28. Since core 57 is energized, the U relay would be energized when polarized contact 41C moved into the magnetic field. Likewise, relay D would be energized by impulses from PB1 and PB2.

Upon further examining the circuits of the UP and DP relays it will be seen that both relay UP and relay U are energized, so that the circuit between wires 92 and 94 is open. The relay UP will be maintained in the circuit, and after the time element relay T has functioned, carriage 28 will proceed along its upward path of travel. As polarized contact 4C enters the magnetic field of core 57, the stopping circuit through polarized switch 4 will be again completed and the carriage 28 will come to rest at core 57. During its stay at this point carriage 38 and polarized contacts 41 and 34 continuously search the array of storage cores, and find no more calls stored above carriage 28. However, they do detect calls stored below, so that the circuit to relay D is completed and when contacts 46 and 46' on the lower limit switch are again closed, the connection between wires 92 and 94 will be completed. Hence relay DP will be energized in turn releasing relay UP and changing the direction of rotation of motor 24, to drive carriage 28 downwardly toward storage cores 51 and 52.

It should be noted that when carriage stopped at core 56 and 57 on the way up, the residual magnetism stored in these cores was reversed by electromagnet 6 in the manner described above, indicating that these calls have been served.

If any further calls come in at any position below carriage 28, before it arrives at, or passes these positions, polarized contact 4C will be actuated, causing carriage 38 to stop at these positions, after which the magnetism stored in the core is reversed or removed. After reaching and answering the last call stored for the particular direction of travel, if the searching means finds that no more calls have been initiated, the release circuits will be energized as described above, relay ST to be deenergized which shuts down the system.

Figures 8, 8A, 9, 9A and 10 illustrate an embodiment of the invention in which current impulses are utilized to provide storages of magnetic energy, which storages are modified or corrected subsequently and then scanned by a suitable scanning means to provide modified or corrected impulses which are utilized for regulating or controlling the action of a machine such as the output of a generator, or the speed of a motor or machine.

As shown in Figure 8, the storage element may comprise a disc 126 made of magnetic material, which is adapted to be rotated past a stationary electromagnet 128 which sets up a magnetic field in response to current impulses. The magnetic field set up in the electromagnet 128 serves to magnetize the periphery of the storage disc 126 as it passes thereunder, the amount of flux stored being proporational to the magnetic flux set up in the electromagnet 128.

As the disc 126 rotates, the magnetic flux existing therein is adapted to be modified by a second electromagnet 130 in which a magnetic field of substantially constant magnitude is maintained at all times. The modified magnetic flux remaining in the disc 126 then moves past the electromagnet 129 in which a voltage is induced which is proportional thereto, which voltage may be utilized to effect the desired control.

The cross-section of the periphery of the disc 126 may be U-shaped in which case, the magnets 128, 129 and 130 will likewise be U-shaped. It may be preferable, in certain cases, to form a plurality of teeth or slots in the periphery of the disc 126 (Fig. 9A) in order to localize the magnetic effect in each portion of the periphery of disc 126 as it passes under the energizing and modifying electromagnets 128 and 130 respectively. The disc 126 may be secured to a shaft 127A, as shown in Fig. 8, which is adapted to be driven by suitable power means 127 such as, for example, an electric motor.

The method and apparatus disclosed broadly in Figs. 8 and 9 may be utilized to control the regulation of line voltage, as shown in greater detail in Fig. 10. Referring to Fig. 10, a generator 131 is shown which is connected through the wires 131A and 131B, respectively, to the conductors 143 and 144, respectively, of a voltage line which it is desired to control. The generator 131 is provided with a main field 132 and a divided auxiliary field 133, the midpoint of which is connected through the wire 158 to the conductor 143 of the voltage line. One end of the field winding 133 is connected through the wire 159, relay contacts 138A and wire 162 to conductor 144 of the voltage supply, and the other end of the winding 133 is connected through the wire 160, relay contacts 137A and wire 161 to the conductor 144 of the voltage supply. The field 133 is so designed that it can completely reverse the polarity of the main field 132 or double its magnetic strength depending on which of the contacts 137A or 138A is closed.

The line voltage existing across the conductors 143 and 144 is impressed on the electromagnet 128 through the wires 145 and 146 respectively. Preferably, the physical characteristics of the electromagnet 128 should be such that for all variations in line voltage normally encountered, no saturation of the magnetic material forming its core will take place. It will be evident, therefore, that as the line voltage varies above and below the desired value, corresponding variations in magnetic flux will be produced in the electromagnet 128 and, since the storage disc 126 is continually rotated directly thereunder, these variations in magnetic flux will be stored on its periphery.

The modifying electromagnet 130 is energized from a direct current voltage source 140 through the wires 149 and 147, and through a variable resistor 141, by means of which the magnitude of the current flowing in the circuit may be controlled. Initially, the current flowing in the circuit of the electromagnet 130 is adjusted until the magnetic flux existing therein has a predetermined reference value. For convenience, the reference flux value in electromagnet 130 will be taken to be exactly equal and opposite to the magnetic flux which exists in the electromagnet 128 when the desired line voltage is impressed upon it. Hence, as the periphery of the disc 126 passes under the electromagnet 130, the magnetic flux existing therein will be modified and the resultant magnetic flux will be the difference between the flux set up by the electromagnet 128 and the flux set up by the electromagnet 130, which flux is proportional to the deviation of the line voltage from the desired value.

As the disc 125 continues to rotate, this resultant flux moves past the electromagnet 129, inducing a voltage therein whose magnitude and polarity is dependent upon the magnitude and polarity of the magnetic flux present in the disc 126. The voltage induced in the electromagnet 129 is applied through the wires 150 and 151 to a resistor 142, connected across the grids of a pair of electronic tubes 135 and 136, the mid tap of the resistor 142 being connected to the cathodes of the tubes 135 and 136. The plate of tube 135 is connected through a wire 152, relay 137 and wire 154 to wire 156 which is connected to one terminal of a voltage source 139. The other terminal of voltage source 139 is connected through a wire 157 to ground. Likewise, the plate of the tube 136 is connected through a wire 153, relay 138 and wire 155 to the wire 156, so that voltage from the source 139 is impressed on the plates of each of the tubes 135 and 136 through the relays 137 and 138 respectively.

For one polarity of the voltage induced in the electromagnet 129, the electronic tube 135 will be energized, thus actuating relay 137, closing its contact 137A and energizing the lower half of the auxiliary field winding 133. When voltage of opposite polarity is induced in the electromagnet 129, electronic tube 136 will be energized, actuating relay 138 and energizing the upper half of the auxiliary winding 133. By making the period of rotation of the disc 126 less than the time constant of the auxiliary field winding 133, the line voltage across the wires 143 and 144 may be maintained substantially constant regardless of load conditions imposed. For all voltages above the desired value, voltage of one polarity will be induced in electromagnet 129, energizing the appropriate half of the auxiliary winding 133, whereas for all voltages less than the desired value, voltage of the opposite polarity will be induced in the electromagnet 129, energizing the other half of the auxiliary winding 133.

The electronic tubes 135 and 136 may be conventional radio tubes, in which case the connections are made as shown, and the response of each tube actuates a relay controlling the energization of the auxiliary field 133. If desired, however, the relays 137 and 138 may be eliminated by using gas filled tubes of the Thyratron or ignitron type, which provide ample plate current for operating the sections of the auxiliary field winding 133 directly without the intervention of the relays.

The rate of correction of the line voltage may be adjusted by decreasing the space between the electromagnets 128, 129 and 130. Thus, by bringing them into a closer spaced relationship, the rate of correction may be increased, and conversely by spacing them further apart, it may be decreased. Moreover, the magnetic flux in the standard electromagnet 130 and the electromagnets 128 and 129 may be adjusted by increasing or decreasing the air gap between these electromagnets and the periphery of the storage disc 126.

When it is desired to use the method and apparatus described above for providing a plurality of constant voltages selectively, several standard electromagnets 130 may be used, which may be switched in or out selectively to provide any one of a number of constant voltages across the wires 143 and 144 of the voltage supply.

The device illustrated in Figures 8, 9 and 10, may also be used to control the speed of a rotating machine. This may be accomplished by connecting the electromagnet 128 to an electric tachometer driven by the device whose speed is to be controlled. As is well known, the electric tachometer provides an output voltage which is proportional to its speed, so that the magnetic flux set up in the electromagnet 128 when the output voltage of the tachometer is applied to it would likewise be proportional to the speed of the device to be controlled. By adjusting the current flowing through the electromagnet 130, a standard magnetic flux may be set up therein, which will be equal and opposite to the magnetic flux set up in the electromagnet 128 when the device to be controlled is operating at the desired speed. Accordingly, any variation in speed above or below the desired value will cause voltages of different sign to be induced in the electromagnet 129, which may be utilized to actuate mechanism for adjusting the speed of the device to be controlled. For example, the device might be used to control the field of an electric motor, much in the same manner as the field of the generator 131 is controlled in Fig. 10, producing the desired speed control.

Figure 12:
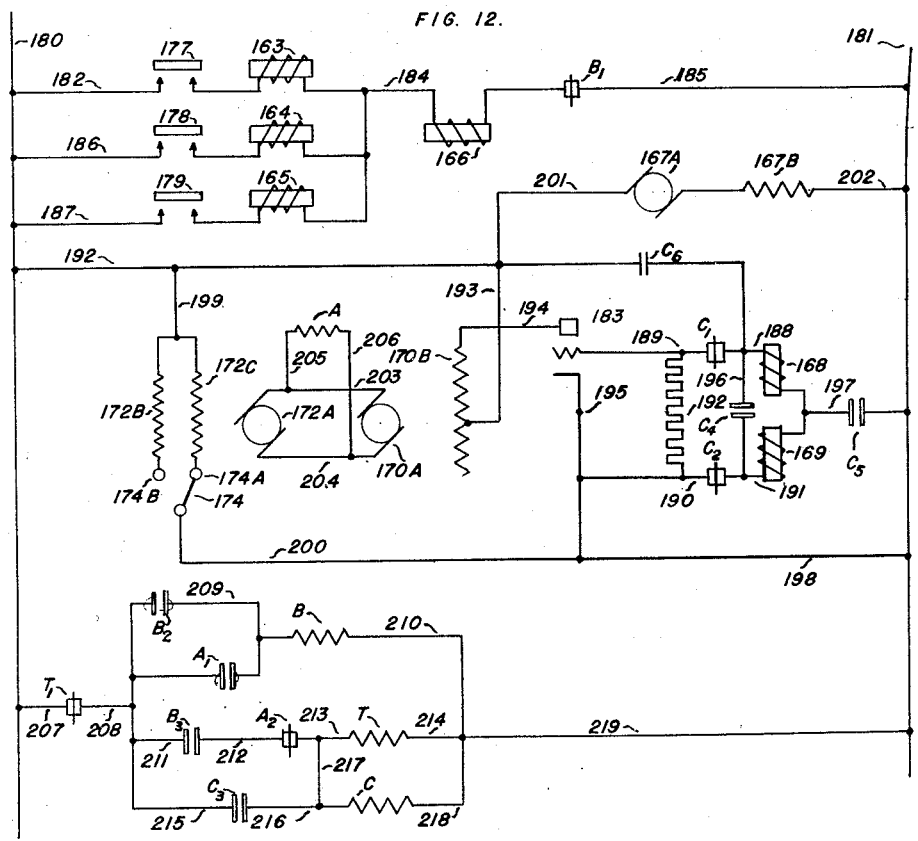
Fig. 12 is a schematic diagram of the electrical circuits associated with the control apparatus shown in Fig. 11.

Figs. 11 and 12 illustrate a modification of the invention in which the magnetic flux stored in storage cores of the type described above, may be utilized to accelerate or decelerate the movement of the device to be controlled as it leaves an initial position and as it reaches a different position, respectively.

Referring to Fig. 11, the number 176 designates a device which it is desired to control in this manner, such as, for example, an elevator car, gun, automatic lathe, or in a chemical process, apparatus for selecting and controlling valves, temperature regulators, etc. The device 176 is adapted to be driven by a motor 172 whose shaft 173 is threaded to form a lead screw for driving a traveling nut 175 on which a scanning coil 168 is mounted. In its motion the scanning coil 168 is adapted to be moved past a plurality of storage discs 163A, 164A and 165A, adjustably secured on the shaft 171 of an electric motor 167. A standard storage disc 166A is also mounted on the shaft 171 and it is adapted to be rotated adjacent to a stationary scanning coil 169 which is connected to the movable scanning coil 168 in such fashion that when the magnetic fluxes linking each coil have the same magnitude and polarity, the resultant voltage in the circuit is zero.

The storage discs 163A, 164A, 165A and 166A may be constructed as shown in Figure 8, or if desired, the periphery of these discs may be slotted to provide a plurality of teeth as indicated in Fig. 9A. Preferably each disc comprises a spider S (Fig. 8A) made of non-magnetic material such as, brass, for example, having a rim R secured thereto, formed of magnetic material, such as, for example, hard steel. These storage cores are adapted to be magnetized by the electromagnets 163, 164, 165 and 166.

As shown schematically in Fig. 12, the electromagnets 163, 164 and 165 are all electrically connected in series with the standard electromagnet 166, so that when any one of the control electromagnets is energized, the standard electromagnet 166 is also energized. Moreover, the standard electromagnet 166 is wound oppositely to the control electromagnets 163, 164 and 165 so that when the latter are energized providing magnetic flux of one polarity, magnetic flux of opposite polarity is set up in the standard electromagnet 166.

For example, when the push button 177 is actuated, current is supplied from the positive line 180 through a wire 182, push button 177, electromagnet 163, wire 184, standard electromagnet 166, closed contact B1, and wire 185 to the negative line 181, thus energizing electromagnet 163 to provide magnetic flux of one polarity and simultaneously energizing standard electromagnet 166 to provide magnetic flux of opposite polarity. The electromagnets 164 and 165 are likewise connected at one end to the wire 184 and through push buttons 178 and 179, respectively, wires 186 and 187, respectively, to the positive line 180.

The motor 167 may be continuously driven, current being supplied from the positive line 180 through a wire 192, wire 201, armature 167A, field winding 167B, and wire 202 to the negative line 181. If desired, however, the circuit may be modified to permit the motor 167 to be energized only after one of the push buttons 177, 178, and 179 has been energized, in which case it is shut down after completing any particular series of operations. Motor 167 is adapted to drive a generator 170 through the shaft 171, the output voltage of the generator 170 being applied to the motor 172 through the wires 203 and 204, respectively (Fig. 12). The generator 170 is provided with a field winding 170B which is adapted to be energized in response to differential voltages from the scanning coils 168 and 169, as will be described in greater detail hereinafter.

The motor 172 is provided with a pair of field windings 172B and 172C which are connected at one end to the wire 199 and through the wire 192 to the positive line 180. The winding 172C is connected to a contactor 174A and the winding 172B is connected to a contactor 174B, which contactors are adapted to be selectively engaged by a contact member 174 which is connected through a wire 200 and a wire 198 to the negative line 181. The two windings 172B and 172C, in conjunction with the contact arm 174 and suitable switching mechanism, serve to reverse the direction of rotation of the motor 172 at its upper and lower limits of travel.

The traveling nut 175 is provided with a cam which engages the contact arm 174 at its upper limit of travel engaging contact arm 174 and contact 174B and completing the circuit through the field winding 172B, causing the motor 172 to reverse its direction of rotation. At its lower limit of travel, the cam secured thereto engages an arm 174D which is connected to the contact arm 174 by a link 174C, thus disengaging contact arm 174 and contact 174B and engaging contact arm 174 and contact 174A, energizing the field winding 172C and again reversing the direction of rotation of the motor 172.

In operation let us assume that the control storage discs 163A, 164A and 165A are magnetized and have north polarity, while the standard electromagnet 166A is also magnetized of south polarity. This is the normal condition of the apparatus and it is the condition to which the storage discs are restored at the conclusion of any sequence of operations, as will be described hereinafter. The motor 167, being energized, rotates the magnetized discs 163A, 164A and 165A, and since the movable scanning coil 168 is at rest adjacent the storage disc 164A which is of north polarity, while the stationary scanning coil 169 remains adjacent the standard storage core 166A which is magnetized of south polarity, voltages of equal magnitude and opposite sign will be induced in each of the scanning windings 168 and 169. Hence the resultant voltage in the circuit is zero.

At this point let us assume that the push button 179 is actuated. This causes current to flow through the control electromagnet 165, and the standard electromagnet 166. The electromagnets 165 and 166 are so wound that normally north polarized storage disc 165A is demagnetized and remagnetized of south polarity, whereas the normally south polarized standard storage disc 166A is demagnetized and remagnetized of north polarity. Inasmuch as the polarity of the storage disc 164A has not been changed, its polarity is now the same as that of the standard storage disc 166A, namely, north. Accordingly, the voltages induced in the scanning coils 168 and 169, respectively, have the same sign and magnitude, so that the resultant voltage in the circuit is twice the voltage induced in one coil. The resultant voltage is impressed upon a resistor 192 through the wire 188, closed contact $C_1$ and wire 189, and wire 191, closed contact $C_2$, and wire 190, respectively.

A positive bias now exists on the grid of the vacuum tube 183 causing current to flow from the positive line 180, wire 192, wire 193, field winding 170B of generator 170, wire 194, through the plate circuit of the tube 183, and wire 195, wire 198 to the negative wire 181. This flow of current through the field winding 170B sets up a magnetic field of such strength as to enable generator 170 to generate full output voltage, which is then applied through the wires 203 and 204, respectively, to the motor 172, which thereupon begins to rotate in the upward direction.

The output voltage from the generator 170 is also applied across a relay A through the wires 205, 206, which is designed to operate at very low voltages. Relay A being energized, its contact $A_1$ closes, completing a circuit from the positive line 180 through wire 207, closed contact $T_1$, wire 208, closed contact $A_1$, B relay, wire 210, and wire 219, to the negative line 181, thus energizing the B relay. Relay B now being energized, its contact $B_2$ closes, thus holding it energized until contact $T_1$ of the T relay is opened. With the energization of relay B, contact $B_1$ in wire 185 is also opened, thus preventing any of the relays 163, 164 and 165 or 166 from being energized until the motor 172 has been driven to the position represented by push button 179.

As the scanning coil 168 moves out of the influence of the storage core 164A, its induced voltage gradually drops to zero, so that the resultant voltage in the circuit gradually drops to one half full value, and the output of the generator 170 likewise is reduced to one half the normal value. Accordingly, the speed of the motor 172 is reduced to one half full speed and the travelling nut 175 continues upwardly at this speed until it reaches the storage core 163A. As it enters the magnetic field of the storage core 163A, the voltage induced in the scanning coil 168 again rises gradually from zero to a maximum value. Hence, the resultant voltage in the circuit applied to the grid of the tube 183 gradually increases again to full value, and the motor 172 increases its speed gradually up to full speed once more.

As the travelling nut 175 reaches its upper limit of travel, the cam mounted thereon engages contact arm 174 which thereupon disengages contact 174A and engages contact 174B, energizing field winding 172B of motor 172 and causing motor 172 to reverse its direction of rotation.

The travelling nut thereupon continues in its downward movement and, as it passes out of the influence of the storage core 163A and into the influence of the storage core 164A, the speed varies from full speed to one half speed, as described above in connection with the upward travel. However, as the scanning coil 168 enters the magnetic field of the storage core 165A, representing the position to which the motor 172 is to be driven, a voltage of opposite sign is induced in the scanning coil 168, because it will be recalled that the storage disc 165 was magnetized of south polarity when the push button 179 was actuated.

Hence, the resultant voltage in the circuit, which is applied to the grid of the vacuum tube 183, drops gradually from half voltage to zero and the output voltage of the generator 170 likewise is gradually reduced from half voltage to zero.

The motor 172, accordingly, reduces its speed as the voltage impressed on its armature is reduced, so that the travelling nut 175 is gradually slowed down until the scanning coil 168 registers with the storage core 165A, at which point it comes to rest.

Inasmuch as the output voltage from the generator 170 is now zero, relay A is deenergized so that its contact $A_2$ closes, completing a circuit from the positive line 180, through a wire 207, closed contact $T_1$, wire 208, wire 211, closed contact $B_3$, wire 212, closed contact $A_2$, wire 213, relay T, wire 214 and wire 219 to the negative line 181, thus energizing the T relay. The relay C, being connected in parallel with the relay T through the wires 217 and 218, is likewise energized, and its contact $C_1$ closes, completing a connection from the wire 208 through the wire 215, closed contract $C_3$ and wire 216 to the C relay, maintaining the latter energized so long as the contact $C_3$ remains closed, in the event that contacts $B_3$ or $A_2$ of the B or A relays are opened.

With the energization of relay C, contacts $C_4$, $C_5$ and $C_6$ are closed and normally closed contacts $C_1$ and $C_2$ are opened, thus supplying current from the positive line 180 through wire 192, closed contact $C_6$, wire 188, scanning coil 168, wire 197, closed contact $C_5$, to the negative line 181, thus energizing scanning coil 168. Current is also supplied from wire 188 through closed contact $C_4$, wire 191, scanning coil 169, wire 197 and contact $C_5$ to the negative line 181, thus energizing stationary scanning coil 169. Inasmuch as contacts $C_1$ and $C_2$ are now open, the flow of current through the electromagnets 168 and 169 has no effect on the vacuum tube 183.

The connections to the electromagnets 168 and 169 are such that the flow of current therethrough sets up a magnetic field, which demagnetizes both the storage core 165A and 166A and remagnetizes them of opposite polarity. Thus the storage core 165A is demagnetized from its south polarity and remagnetized of its normal north polarity, while the standard storage core 164A is demagnetized of its north polarity and remagnetized of its normal south polarity.

The T relay is so designed that its contact $T_1$ does not open until a predetermined period of time has elapsed after it has been energized. This enables the electromagnets 168 and 169 to be energized for restoring the storage cores to their normal polarity, as described above. After this operation has been completed, the contact $T_1$ on the T relay opens, simultaneously deenergizing both the B and C relays, closing contact $B_1$ on the B relay, and enabling the system to respond to any subsequent signals from the push buttons 177, 178 and 179.

If desired, the system can be made to operate in collective fashion by eliminating contact $B_1$ on the B relay and connecting wire 185 directly to the electromagnet 166, and also eliminating contact $C_4$, connecting wire 196 directly to wire 191. It also is necessary to provide additional circuits for energizing the coil 169 momentarily as it reaches the end of its travel.

It will be noted that as scanning coil 168 moves past a storage core of the same magnetic polarity as the standard storage core 166A, the speed of motor 172 increases from half speed to full speed. In some applications it may be desirable to have motor 172 operate at a constant speed until it reaches a storage core of magnetic polarity opposite to that of storage core 166A. This may be done by designing the field winding 170B of generator 170 so that it will become saturated when the voltage across wires 188 and 191 is greater than the voltage generated in one scanning coil.

In a further modification, the magnetic flux stored in a storage core is scanned by periodically interrupting the stored magnetic flux to induce a voltage in the energizing coil of the storage means. This voltage is then impressed on a standard voltage of similar characteristics and the resultant voltage in the circuit may then be utilized to effect any desired control of an apparatus or process. The magnetic flux may be interrupted, for example, by periodically varying the reluctance of the magnetic circuit of the storage means, as shown in Figures 13, 14, 15 and 16.

Considering Figure 13, a U-shaped storage means 220 is shown having pole pieces 221 and 222, respectively, between which a rotor 223 is adapted to be rotated. The rotor 223 is made of magnetic material and has generally the shape of an I, so that in one position the magnetic reluctance between the pole pieces 221 and 222 has a relatively low value, whereas for a rotor position 90° away, the magnetic reluctance is considerably reduced.

It will be evident that as the rotor 223 is rotated, the magnetic reluctance of the circuit, including the core 220, the pole pieces 221 and 222, the rotor 223 and the air gaps between the rotor 223 and the pole pieces 221 and 222, will vary periodically. A winding 224 is also provided on the core 220 which sets up a magnetic flux therein, and also serves as a pick-up device in which voltage may be induced due to the periodically varying magnetic flux existing in the core 220.

Referring to Figure 14, the winding 224 is adapted to be energized by a continuous source of voltage 225, one end of which is connected through a wire 226, wire 227, push button 228 and wire 229 to the upper end of the winding 224, the other pole of the voltage source 225 being connected through a wire 230 and wire 231 to a mid tap on the energizing winding 224. The lower end of the winding 224 is also connected to the voltage source 225 through a wire 232, wire 233, push button 234, wire 235 and wire 226. Thus when the push button 228 is actuated, the upper half of the winding 224 will be energized, setting up a magnetic flux of one polarity in the core 220, and since the rotor 223 is rotated at a constant rate of speed, a voltage of given phase and magnitude will be induced in the winding 224. When the push button 234 is actuated, the lower half of the winding 224 will be energized, setting up magnetic flux of reverse polarity in the storage core 220 inducing an alternating voltage of opposite phase and the same magnitude in the winding 224.

As indicated above, the voltages induced in the lower half of the winding 224 as the core 223 is rotated are impressed upon the standard voltage and the resultant voltage is used to effect a desired control. The standard voltage is induced in a winding 236 on a storage core 237, having pole pieces 238 and 239 between which the rotor 223 is adapted to be rotated. The storage core 237 is maintained continuously magnetized of a given polarity by means of an auxiliary winding 240, energized from a source of voltage 241 through the wires 242 and 243. Accordingly, as the reluctance of the magnetic circuit of the core 237 is varied by rotating the rotor 223, an alternating voltage of a given phase and magnitude is induced in coil 236. One terminal of the coil 236 is connected through a wire 244 to wire 231 which is connected to the mid tap of the coil 224 on storage core 220. The other terminal of the coil 236 is connected through a wire 245 to a terminal 246 of an amplifier 247 of a well known type, the other terminal 248 of the amplifier 247 being connected through a condenser 249 and a wire 250 to the wire 232 which is connected to the lower end of the winding 224 on storage core 220.

The lower half of the winding 224 is oppositely connected to the winding 236 by means of the connections described above, so that if the voltages induced in both of these coils have the same phase and magnitude the resultant voltage in the circuit is zero. Hence, since the actuation of the push button 228 sets up magnetic flux in the core 220 having the same polarity as the flux maintained in the core 237, the voltages induced in the coils 224 and 236 will be of the same phase and magnitude and the resultant voltage will be zero.

On the other hand, when the push button 234 is actuated, setting up a magnetic field in the core 220 of opposite polarity to that maintained in the core 237, the voltage induced in the lower half of the coil 224 will be of opposite phase and of the same magnitude as that induced in the coil 236, so that the resultant voltage in the circuit will be twice that induced in either coil. This resultant voltage is amplified by the amplifier 247 and the amplified voltage is transmitted through the wires 251 and 252 to a rectifier 253 of a well known type, providing a direct current voltage to the wires 254 and 255 which actuates a relay 256 effecting any desired control. The condenser 249 prevents the relay 256 from being actuated when the push button 234 is actuated.

As shown in Figure 15, a plurality of control storage cores 220 may be used with a single standard core 237, in which case the rotor 223 may be formed as an elongated rod which may be journalled at one end in a bearing 259 and rotated at constant speed by a motor 257. By providing suitable circuit connections, such a plurality of cores 220 may be utilized to store the effects of current impulses initiated in any suitable manner, which storages may be subsequently utilized to initiate secondary impulses for controlling an apparatus or a process in any desired manner.

Figure 16 illustrates a specific application of the control method and apparatus which is illustrated broadly in Figures 13–15, in which a device $M_3$ is adapted to be driven by a motor $M_2$, providing a position control such as is used for example, in the control of guns or elevators. Considering Figure 16, a plurality of storage cores $F_1$–$F_8$ are shown, which may be similar in construction to those shown in Figures 13 and 14 and which represent control positions to which the machine $M_3$ may be driven. The positions corresponding to the cores $F_1$–$F_8$ may be selected by the corresponding push buttons $PB_1$–$PB_8$ which initiate current impulses for setting up magnetic flux in the cores $F_1$–$F_8$, respectively.

A standard storage core FC is also shown, which provides a standard voltage with which voltages induced in the cores $F_1$–$F_8$ may be compared, as indicated above. In order to reduce the wiring used, a pair of commutators $COM_1$ and $COM_2$ are provided which complete circuits for effecting the desired control, as will be described hereinafter. The commutator COM₁ comprises a plurality of stationary segments, 0–8, adapted to be selectively engaged by a rotating brush B₁ driven by a motor M₁ from shaft 259 through gearing 260, shaft 261, and gearing 262. The commutator COM₂ likewise comprises a plurality of stationary segments, 0–8, adapted to be selectively engaged by a rotating brush B₂ which is also driven by the motor M₁ through shaft 261, gearing 263, shaft 264 and gearing 265.

The motor M₁ also drives the rotor 223 from shaft 259 through gearing 266, by means of which the reluctance of the magnetic paths of the storage cores F₁–F₈ may be periodically varied. The motor M₂ is provided with a shaft extension SS which serves as a lead screw for driving a travelling nut TN vertically a distance proportional to its rotation. The travelling nut TN has secured thereto a roller contact RO which is adapted to engage selectively a plurality of vertically disposed contacts 1–8 connected to the segments 1–8 of commutator COM₂, respectively.

In operation, let us assume that the travelling nut is at rest in the position shown in Figure 16, so that its roller contact RO is in engagement with contact 4. At this time the control storage cores F₁–F₈ and the standard storage core FC are all magnetized of the same polarity although, if desired, they might be entirely demagnetized. If now it is desired to dispatch the machine M₃ to a position corresponding to that represented by push button PB₁, the push button PB₁, may be actuated. This completes the circuit from the positive line 267 through the wire 268, push button PB₁, wire 269, winding 270 on storage core F₁, wire 271, wire 272, and relay ST to the negative line 273, thus magnetizing the core F₁ of opposite polarity to the cores F₂–F₈ and the standard core FC, and simultaneously energizing the relay ST winding.

Contacts ST₁ and ST₂ on relay ST are thus closed, completing several circuits effecting the control. The closing of contact ST₂ short circuits the winding of relay ST, and the closing of contact ST₁ completes a circuit from the positive wire 267 through a wire 274, wire 275, closed contact REL₁ and the auxiliary winding AUX of the ST relay to the negative 273, thus maintaining the contacts ST₁ and ST₂ closed until closed contact REL₁ is opened by energization of relay REL.

The closing of contact ST₁ also completes a circuit from the wire 267 through a wire 276, energizing winding 277 of the standard storage core FC, wire 278, wire 272, wire 280 and contact ST₂ to negative line 273, thus maintaining magnetic flux in the standard core FC of opposite polarity to that at present existing in control storage core F₁, and of the same polarity as the magnetic flux existing in control storage cores F₂–F₈.

With the closing of contact ST₁, a circuit is completed from the positive wire 267 through wire 281, wire 274, wire 275, wire 282, motor M₁, and wire 283 to the negative line 273, thus energizing the motor M₁ and causing it to rotate at a constant speed. The rotation of the motor M₁ drives the rotor 223, causing the reluctance of the magnetic circuits of the control storage cores F₁–F₈ and the standard control core FC to vary periodically and inducing voltages in the windings thereof whose phase is determined by the polarity of the magnetic flux existing therein and whose magnitude is determined by the magnitude of the flux existing therein.

The ends of the windings on storage cores F₁–F₈ are connected to the segments 1–8, respectively, of commutator COM₁, so that as the brush B₁ rotates in connects these windings selectively in a series circuit through a wire 284, condenser CN, a wire 285, transformer primary winding TR, pickup winding 286 of standard storage core FC, and wire 278 to wire 272 which is connected to the mid tap of each of the windings on storage cores F₁–F₈. Accordingly, it will be evident that as the brush B₁ rotates, the voltages induced in the lower half of the windings on the storage cores F₁–F₈ will be selectively added to the voltage induced in the winding 286 of the standard storage core FC.

Inasmuch as the magnetic flux existing in the F₂–F₈ storage cores is of the same polarity as that existing in storage core FC, and since the windings on the storage cores F₂–F₈ are oppositely connected to the winding on storage core FC, the resultant voltage in the circuit will always be zero. However, upon the actuation of push button PB₁ the magnetic flux existing in storage core F₁ is reversed, and since its winding is oppositely connected to the winding 286 on storage core FC, these two voltages add and the resultant voltage in the circuit is twice that induced in either.

This resultant voltage is applied to the primary transformer winding TR and the voltage from the output winding TRS is transmitted through the wires 288 and 289 to a bridge type rectifier RC providing a direct current voltage which is thereupon applied to the grid of a vacuum tube AT. The rectified voltage provides a positive bias for the tube AT causing plate current to flow, or varying whatever plate current may be originally flowing, rendering the tube AT conductive. This causes current to flow through a circuit from the positive wire 267 through the wire 290, relay C, wire 291, tube AT, wire 292, wire 272, wire 280 and through closed contact ST₂ to the negative line 273. Thus, each time the brush B₁ on commutator COM₁ engages segment 1 which is connected to the control storage core F₁, the tube AT will be rendered conductive and relay C will be energized.

As the brush B₂, during the course of its rotation, engages segment 0 on commutator COM₂ a circuit will be completed from the positive line 267 through contact ST₁, wire 281, wire 293, brush B₁ engaging contact segment 0, wire 294, wire 295, wire 296, closed contact A₁, wire 297, closed contact RR₁, wire 298 and relay A to the negative line 273, thus energizing the A relay and closing its contacts A₂ and A₃ and opening its contact A₁. The closing of contact A₃ connects the wire 275 through the wire 299, wire 300, closed contact A₃, wire 301, wire 297, closed contact RR₁, wire 298 and relay A to the negative line 273, thus maintaining the A relay energized until contact ST₁ is broken by the energization of the ST relay.

Contact A₂ being closed, a circuit is completed from the positive line 267, through closed contact ST₁, wire 281, wire 293, brush B₁ engaging contact segment 0 on commutator COM₂, wire 294, wire 295, closed contact Y₁, wire 302, closed contact A₂, wire 303, closed contact U₁, closed contact D₁, wire 304, and relay X to the negative line 273, thus energizing the X relay and opening its contact X₁ and closing its contacts X₂, X₃ and X₄.

The closing of contact X₂ connects the wire 275 through wire 305, closed contact X₂, wire 306, relay Y, wire 303, closed contact U₁, closed contact $D_1$, wire 304, and relay X to the negative line 273, thus energizing the Y relay and opening its contact $Y_1$ and closing its contact $Y_2$. The opening of contact $Y_1$ disconnects the wire 295 from the wire 302, but since contact $X_2$ is now closed, both the X and Y relays remain energized.

As the brush $B_2$ again engages the segment 0 on commutator $COM_2$ during the course of its rotation, a circuit is completed from the positive line 267 through closed contact $ST_1$, wire 281, wire 293, brush $B_2$ engaging contact segment 0, wire 294, wire 295, wire 307, closed contact $X_3$, wire 308 through the left half 309 of the auxiliary winding 310, on relay P, and wire 311 to the negative line 273; hence each time the brush $B_2$ engages contact segment 0 on commutator $COM_2$, the left hand side of the auxiliary winding of the P relay is energized.

Moreover, as the rotating brush $B_2$ on commutator $COM_2$ engages the contact segment 4 which is connected to contact segment 4 on commutator $COM_3$ engaging the roller contact RO on the travelling nut TN, the right hand side 312 of the auxiliary winding of the P relay is energized. To this end current is supplied from the positive line 267 through closed contact $ST_1$, wire 281, wire 293, brush $B_2$ engaging contact segment 4 on commutator $COM_2$, wire 313, contact segment 4 on commutator $COM_3$ engaging roller contact RO, wire 314, wire 315, closed contact $RR_2$, wire 316, and the right hand side 312 of the auxiliary winding 310 of relay P to the negative line 273. It will be evident, therefore, that each time the brush $B_2$ engages the contact segments 0 and 4 on commutator $COM_2$, the left half and right half, respectively, of the auxiliary winding of the P relay will be energized.

The P relay is provided with a polarizing winding which is continuously energized from the positive line 267 through closed contact $ST_1$, wire 281, wire 274, wire 275, wire 317, wire 318, and P relay to the negative line 273. As each half of the auxiliary winding of the P relay is energized, its polarized contactor $P_1$ is adapted to make contacts 318 and 319 alternately completing a connection through the U and D relays, respectively, to the negative line 273.

It will be seen that while the brush $B_2$ is moving over the contact segments 0—8—7—6 and 5, during the course of its rotation the polarized contactor $P_1$ of relay P will be in engagement with contact 318, connecting the wire 320 through the up relay U to the negative line 273, whereas as the brush $B_2$ moves over the contact segments 3—2 and 1, during the course of its rotation the polarized contactor $P_1$ is in engagement with contact 319 connecting the wire 320 through down relay D to the negative wire 273. Thus the commutator and the polarized relay P determine whether the signals stored in any particular energized storage core such as $F_1$, for example, are above or below the present position of the machine $M_3$.

Meanwhile, each time the rotating brush $B_1$ engages contact segment 1 on commutator $COM_1$, the relay C is energized, as described above, closing its contacts $C_1$ and $C_2$, while the polarized contactor $P_1$ on polarized relay P is in engagement with contact 319. This completes a circuit from positive line 267 through wire 274, wire 275, wire 299, wire 300, closed contact $A_3$, wire 301, closed contact $RR_1$, wire 321, closed contact $C_1$, wire 320, contactor $P_1$ engaging contact 319, and relay D to the negative line 273.

The closing of contact $C_1$ thus energizes the D relay closing its contacts $D_2$ and $D_4$ and opening its contacts $D_1$, $D_3$ and $D_5$. The closing of contact $D_2$ connects the D relay directly to the wire 321 through wire 322 and wire 323, thus maintaining it energized when contact $C_1$ again opens after brush $B_1$ on commutator $COM_1$ has passed contact segment 1. The opening of contact $D_1$ on the D relay deenergizes the X and Y relays, opening contacts $X_2$, $X_3$, $X_4$, $Y_2$ and closing contacts $X_1$ and $Y_1$.

The closing of contact $X_1$ connects the wires 324 and 325 supplying current to the DP relay when the rotating brush $B_2$ again engages contact segment 0 on commutator $COM_2$. At this time a circuit is completed from the positive line 267 through closed contact $ST_1$, wire 281, wire 293, rotating brush $B_2$ engaging contact segment 0, wire 294, wire 295, wire 324, closed contact $X_1$, wire 325, closed contact $D_4$, wire 325, normally closed contacts $U_3$ and $UP_1$, and relay DP, to the negative line 273, thus energizing the DP relay, closing its contacts $DP_1$, $DP_2$, $DP_3$ and $DP_4$ and opening contact $DP_5$.

The closing of contact $DP_3$ connects the wire 325 through the wire 317 to the wire 275, thus holding the DP relay energized until either the $U_3$ or $UP_1$ contacts are opened, or contact $ST_1$ is opened. The closing of contact $DP_4$ connects the wire 326 to the wire 327 completing a circuit from the positive line 267 through closed contact $ST_1$, wire 281, wire 274, wire 275, wire 326, closed contact $DP_4$, wire 327, closed contact $STOP_1$, wire 328 and relay RR to the negative line 273, thus energizing the RR relay and closing its contacts $RR_3$, $RR_4$, and opening its contacts $RR_1$, $RR_2$ and $RR_5$. The closing of contact $RR_3$ completes the circuit for energizing the motor $M_2$ from the positive line 267 through closed contact $ST_1$, wire 281, wire 274, wire 275, wire 329, closed contact $RR_3$, wire 330, closed contact $DP_2$, wire 331, armature $MA_2$ of the motor $M_2$, wire 332, closed contact $DP_1$, wire 333 and wire 334 to the negative line 273. The motor $M_2$ is now energized and it rotates so as to drive the travelling nut TN in a downward direction.

The opening of contact $RR_1$ breaks the connection between wires 297 and 321, thus deenergizing both the A and D relays. Likewise, the opening of contact $RR_2$ disconnects wire 315 from wire 316 and prevents the right hand side of the auxiliary winding of the polarized relay P from being energized, so that the polarized contactor $P_1$ remains in engagement with contact 318.

The travelling nut TN continues downwardly until its roller contact RO engages contact segment 1 on commutator $COM_3$. Then, when next to the rotating brush $B_2$ engages segment 1 on commutator $COM_2$, voltage is supplied to the STOP relay from the positive line 267 through the closed contact $ST_1$, wire 281, wire 293, brush $B_2$ engaging contact segment 1 on commutator $COM_2$ wire 335, contact segment 1 on commutator $COM_3$ engaging roller contact RO, wire 314, wire 315, closed contact $RR_4$, closed contact $C_2$, wire 336 and the STOP relay to the negative wire 273. The energization of the STOP relay closes its contacts $STOP_2$ and $STOP_3$ and opens its contact $STOP_1$. The closing of contact $STOP_3$ connects the wire 337 to wire 338, thus maintaining the STOP relay energized after contact $C_2$ is open due to the deenergization of the C relay until closed contact $T_1$ is opened by operation of relay T. The closing of contact $STOP_2$ completes a circuit from the positive line 267, closed contact $ST_1$, wire 281, wire 274, wire 275, contact $STOP_2$, wire 339, and the T relay to the negative wire 273, thus energizing the T relay. The T relay is a time delay relay, however, so that its contact $T_1$ is not actuated until a predetermined time after it has been energized to enable certain operations and circuits to be completed, as will be described.

The opening of contact $STOP_1$ breaks the circuit between the wires 327 and 328, thus deenergizing the RR relay, causing its contacts $RR_3$ and $RR_4$ to open, and causing its contacts $RR_1$, $RR_2$ and $RR_5$ to close. The opening of contact $RR_3$ disconnects wire 329 from wire 330, thus deenergizing the motor $M_1$ and causing it to come to rest adjacent the contact segment 1 on commutator $COM_3$.

The closing of the contact $RR_5$ connects the wire 314 to wire 284, so that when the rotating brush $B_2$ next engages contact segment 1 on commutator $COM_2$, a circuit is completed from the positive line 267 through closed contact $ST_1$, wire 281, wire 293, rotating brush $B_2$ engaging contact segment 1 on commutator $COM_1$, wire 335, closed contact segment 1 on commutator $COM_3$ engaging roller contact RO, wire 314, closed contact $RR_5$, wire 284, rotating brush $B_1$ engaging contact segment 1 on commutator $COM_1$, wire 340, the right half 286 of the winding on storage core $F_1$, wire 271, wire 272, wire 280 and closed contact $ST_2$ to the negative line 273. This passes an impulse of current through the winding of the storage core $F_1$ demagnetizing it and remagnetizing it of the normal polarity.

If none of the push buttons $PB_1$–$PB_8$ has been actuated meanwhile, the rotating brushes $B_1$ and $B_2$ on commutators $COM_1$ and $COM_2$, respectively, will make two revolutions, and when next the brush $B_2$ engages contact segment 0 on $COM_2$ the release relay REL will be energized from the positive line 267 through closed contact $ST_1$, wire 281, wire 293, rotating brush $B_2$, engaging contact segment 0 on commutator $COM_2$, wire 294, wire 341, wire 342, closed contact $U_2$, closed contact $D_5$, closed contact $X_4$, closed contact $Y_2$, wire 343, relay REL to the negative line 273, closing contact $REL_2$ and opening contact $REL_1$. The closing of contact $REL_2$ connects the wire 342 to the wire 344, thus maintaining the REL relay energized after the rotating brush $B_2$ has left the contact segment 0. The opening of contact $REL_1$ breaks the connection at wire 275, deenergizing the holding winding on the ST relay and opening its contacts $ST_1$ and $ST_2$, thus deenergizing the motor $M_1$ and bringing the system to rest.

Figs. 17 and 18 illustrate a phasemeter, for determining the phase sequence of an alternating current supply, which is constructed in accordance with my invention. The apparatus functions to supply voltage from the line to a motor so long as the alternating current voltage has a given phase sequence. If, however, through a wrong connection, for example, voltage of reverse phase is applied to the motor to be controlled, the phasemeter of the invention initiates impulses for breaking the circuit to the motor, thus preventing any damage which might arise if the motor were allowed to rotate in a direction opposite to its normal direction of rotation.

As shown in Figs. 17 and 18 the phasemeter comprises essentially a disc made of magnetizable material 400 mounted on the shaft 401 of a motor 402 which receives power from a three-phase alternating current supply $a$, $b$, $c$ through the wires 403, 404 and 405. So long as the phase sequence of the voltages from the supply $a$, $b$, $c$, remains constant, the motor 402 will drive the disc 400 continuously in the direction indicated by the arrow (Fig. 18). However, if the phase sequence is reversed, the motor 402 will drive the disc 400 in the reverse direction, namely, in a counterclockwise direction.

The disc 400 is provided with a rim 406 having a U-shaped cross-section, which is adapted to be moved past a pair of stationary electro-magnets 407 and 408. The electro-magnet 407 receives a continuous current through the wires 409 and 410 from a rectifier 411, which receives its power from the lines $a$ and $b$ of the alternating current supply through the wires 412 and 413, respectively. The electro-magnet 408 likewise receives continuous current from the rectifier 411 through the wires 414 and 415. The electro-magnet 407 is so wound that, so long as current flows through its winding, it will magnetize the rim 406 of north magnetic polarity, whereas the electromagnet 408 is so wound as to magnetize the rim 406 of south magnetic polarity.

The magnetic flux set up in the rim 406 by the electromagnets 407 and 408 is adapted to be scanned by a polarized switch 416. The polarized switch 416 is provided with a polarized contactor 417 which normally lies between the sides of the U forming the rim 406. The switch 416 is adapted to engage either of the contacts 418 or 419 (Fig. 17), depending upon the polarity of the magnetic flux set up therein by the electromagnets 407 and 408.

As shown in Fig. 18, contacts 418 and 419 are electrically connected through the wires 420 and 421, respectively, to a switch 422 of a well known type which is adapted to make or break the circuit between a motor 423 to be controlled, and the voltage supply $a$, $b$, $c$. The polarized contactor 418 is also connected to the switch 422 through the wire 424. The switch 422 is so designed that when polarized contactor 417 engages contact 418, the motor 423 is connected to the lines $a$, $b$, $c$, through the wires 425, 426 and 427. Conversely, when the polarized contactor 417 engages contact 419, the switch 422 is opened and voltage is no longer supplied to the motor 423 from the voltage supply $a$, $b$, $c$.

In operation the motor 402 normally drives the disc 400 in the direction indicated by the arrow (Fig. 18), at any speed, constant or variable. Accordingly, the portion of the rim 406 passing adjacent the polarized switch 416 will always have a magnetic polarity determined by the electromagnet 408, namely south magnetic polarity. This polarity will hold the polarized contactor 417 in engagement with the contact 418, maintaining the switch 422 closed and supplying voltage to the motor 423.

If now for some reason or other, the phase sequence of the voltages forming the supply $a$, $b$, $c$, is reversed, the motor 402 will drive the disc 400 in the reverse direction to that indicated by the arrow in Fig. 18. Accordingly, the portion of the rim 406 adjacent the polarized switch 416 will have a magnetic polarity determined by the electromagnet 407, namely, north magnetic polarity. This will move the polarized contactor 417 out of engagement with the contact 418 and into engagement with contact 419 opening the switch 422 and disconnecting the motor 423 from the line $a$, $b$, $c$. It will be evident, therefore, that the motor 423 will operate only so long as the alternating current line $a$, $b$, $c$, has the proper phase sequence to give the correct direction of rotation.

In the phasemeter constructed in accordance with my invention, the period of time elapsed between the reversal of the phase and the interruption of the circuit to the motor 423 may be adjusted by varying the speed of the motor 402 or by moving the magnet 408 so as to be closer to the polarized contactor 417.

While the device has been described in connection with a motor, obviously it might be applied to a wide variety of other electrical equipment. Furthermore, although a three-phase alternating current supply has been shown, the device may be readily adapted for controlling the operation of electrical equipment from any polyphase source of alternating voltage.

Although a number of the embodiments of my invention have been described above as particularly adapted for controlling specific mechanisms, such adaptations are presented merely by way of example and it is to be understood that the invention is not to be limited by them.

It is apparent that my invention is applicable primarily to an apparatus or plurality thereof, or one or more processes. I have referred to these in the plural, as indicating a general class and type, and I intend this expression to include a single apparatus or process, as well as a plurality of either or both.

The manner in which my invention is to be applied to the achieving of such objects will be readily apparent from the previous general and detailed description of my invention. It will also be apparent that the invention may be applied to achieve numerous other types of control, an enumeration of which would only encumber the description. I intend all such modifications and variations of my invention to be included within the same, as defined in the following claims.

I claim:

1. An apparatus for controlling the operation of a movable element of an apparatus, which comprises means for providing an impulse indicative of an operation to be performed subsequently by the element in achieving the desired control, means for storing the effect of said impulse magnetically, means adapted to cooperate with said magnetic storage means in accordance with the ability of the movable element to perform the desired subsequent operation, for providing a subsequent and separate impulse, means for actuating said element, and means operating in response to said subsequent impulse for controlling the operation of said actuating means to achieve the desired control of the apparatus.

2. An apparatus for controlling the operation of a movable element of an apparatus, which comprises means for providing an electric current impulse indicative of an operation to be performed subsequently in achieving the desired control, means for storing the effect of said current impulse magnetically, means for scanning said energy storage subsequently in accordance with the ability of the movable element to perform the desired subsequent operation, to provide a separate impulse, means for actuating said element, means operating in response to said subsequent impulse for controlling the operation of said actuating means to achieve the desired control of the apparatus, and means for rendering said energy storage ineffectual.

3. An electrical control apparatus for controlling the operation of an element adapted to be moved to a plurality of positions by a power means, which comprises a plurality of means for selectively providing impulses indicative of the positions to which said element can be moved, means for storing the effects of said impulses magnetically, means for scanning said storage means in accordance with the movement of said element to be controlled, to form a subsequent and separate impulse corresponding to each magnetic storage resulting from a provided impulse, and means responsive to said subsequent impulses for actuating said power means to move said element to said respective positions.

4. An electrically controlled apparatus comprising an element adapted to be moved to a plurality of positions, power means for moving said element to said positions, and means for controlling the application of said power means to said element, said latter means comprising a plurality of means for providing impulses indicative of the positions to which said element can be moved, means for storing the effects of said impulses magnetically, means for scanning said storage means independently of the order in which the impulses were stored to form a subsequent and separate impulse corresponding to each magnetic storage means in which there is a magnetic storage, and means responsive to said subsequent impulses for achieving the control of the application of the power means to said element.

5. An electrical control apparatus for controlling the operation of a movable element of an apparatus, which comprises means for providing an impulse indicative of the desired operation of the element, magnetic storage means for storing the effect of said impulse magnetically, a magnet adapted to be positioned in proximity with said magnetic storage means whereby said magnet may be moved by the interaction of its flux with the flux of the magnetic storage, electrical contacts associated with an electrical circuit and actuated by movement of said magnet to establish said circuit when said magnet is in proximity with a magnetic storage means in which an impulse has been stored, and means responsive to said established electrical circuits for achieving the desired operaton of sad element.

6. An electrical control apparatus for controlling the operation of an element adapted to be moved to a plurality of positions by power means, which comprises a plurality of means for providing impulses indicative of the positions to which said element can be moved, a magnetic storage means corresponding to each impulse providing means for storing the effects of said impulses magnetically, whereby a magnetic storage results in those magnetic storage means corresponding to those initiating means from which impulses were provided, a magnet adapted to be brought into proximity with said magnetic storage means whereby said magnet may be moved by the interaction of its flux with the flux of the magnetic storage, electrical contacts associated with an electrical circuit and actuated by movement of said magnet to establish said circuit when said magnet is brought into proximity with a magnetic storage means in which a provided impulse has been stored, and means responsive to said established electrical circuit for actuating said power means to move said element to said respective positions.

7. An electrically controlled apparatus comprising an element adapted to be moved to a plurality of positions, power means for moving said element to said positions, and means for controlling the application of said power means to said element, said latter means comprising a plurality of means for providing impulses indicative of the positions to which said element can be moved, means for storing the effects of said impulses magnetically, means for scanning said storages to provide a subsequent and separate impulse corresponding to each magnetic means in which there is a magnetic storage, magnetic means for determining the position of said element with respect to the position to which it is to be moved, and means responsive to said subsequent impulses and to said position determining means for controlling the application of the power means to said element to move it to said desired position.

8. In an electrical control apparatus, a device for relating the position of an element to other positions to which the element may be moved, comprising a magnetic storage member, means operatively associated with the element for magnetizing said storage member, means for adjusting the magnetic condition of the magnetizing means in accordance with the direction of movement of said element, scanning means responsive to the magnetic condition of the storage member to provide one impulse for all positions of the scanning means below the position representing the position of the element to be controlled, and for providing a different impulse for all positions of the scanning means above said position of the controlled element, and means operable by said impulse to control the apparatus.

9. In an electrical control apparatus, the combination of an element adapted to be moved to a plurality of positions, power means for moving said element to said respective positions, a magnetic storage member, means operatively associated with said element for magnetizing said storage member, means for adjusting the magnetic condition of the magnetizing means in accordance with the direction of movement of said element, means for scanning said storage member to provide an impulse, means responsive to said impulse for preparing a circuit to energize said power means, a plurality of means for selectively providing impulses indicative of said element positions, means for storing the effects of said impulses magnetically, means for scanning said storage means to provide a subsequent and separate impulse for each magnetic storage, and means selectively responsive to said subsequent impulses for completing said prepared circuit for energizing the power means to actuate the element to be controlled.

10. In an electrical control apparatus, the combination of an element adapated to be moved to a plurality of positions, means for selectively providing electrical impulses indicative of said respective positions, means for storing the effects of said impulses magnetically, means for inducing voltages from said magnetic storages, means for modifying said induced voltages to provide resultant voltages, power means for moving said element, and means selectively responsive to said resultant voltages for actuating said power means to move the element to said positions.

11. In an electrical control apparatus, the combination of an element adapted to be moved to a plurality of positions, power means for moving said element, a plurality of impulse providing means each representing a position to which the element may be moved, a plurality of magnetic storage means corresponding to said impulse providing means, means for setting up magnetic flux in each of said magnetic storage means when the impulse providing means corresponding thereto is actuated, whereby to provide magnetic storages therein, means associated with said magnetic storage means for inducing voltages from the respective magnetic fluxes existing therein, means for selectively applying said induced voltages to a standard voltage to provide a resultant voltage for each magnetic storage means whose corresponding impulse providing means has been actuated, means responsive to the relative position of the element with respect to a position corresponding to an actuated impulse providing means for preparing a circuit for energizing the power means, and means responsive to the resultant voltage corresponding to said actuated impulse providing means for completing the circuit for energizing the power means to move the element to the position represented by the actuated impulse providing means.

12. In an apparatus of the class described, means movable to different positions, power motive means for moving said movable means to the different positions, a plurality of separate means to provide impulses indicating the positions to which the movable means is to move, a separate and different magnetic storage means corresponding to each separate impulse providing means for storing said impulses magnetically, means cooperating with said different storage means for priviving subsequent impulses by said magnetic storages, and means to control the application of power to said motive means to move said movable means to different positions in response to said subsequent impulses.

13. In an apparatus of the class described, an element movable to different positions, power motive means for moving said element to different positions, a plurality of means to provide impulses indicating the positions to which the movable element is to move, a magnetic storage means corresponding to each impulse providing means for storing said impulses magnetically, means movable in relation to the movement of said movable element, means cooperating with said storage means for providing subsequent impulses when the position of said movable means indicates that the movable element is at a position at which an impulse was provided, and means operating in response to said subsequent impulses to control the application of power to said motive means to move said movable element to positions at which impulses were provided.

14. In an apparatus of the class described, means movable to different positions, power motive means for moving said movable means to different positions, means at the different positions to provide an impulse indicating that the movable means is to move to that position, a magnetic storage means corresponding to each impulse providing means for storing said impulses magnetically, means cooperating with said storage means for providing subsequent impulses by said magnetic storage, and means to control the application of power to said motive means to move said movable means to different positions in response to said subsequent impulses.

15. In an apparatus of the class described, an element movable to different positions, power motive means for moving said element to different positions, means at the different positions to provide an impulse indicating that the element is to move to that position, a magnetic storage means corresponding to each impulse providing means for storing said impulses magnetically, means movable in relation to the movement of said movable element, means cooperating with said storage means for providing subsequent impulses when the position of said movable means indicates that the movable element is at a position at which an impulse was provided, and means operating in response to said subsequent impulses to control the application of power to said motive means to move and stop said movable element at positions at which impulses were provided.

16. An apparatus for controlling the operation of a movable element of an apparatus, which comprises means for providing an impulse indicative of an operation to be performed subsequently by said element in achieving the desired control, means for storing the effect of said impulse magnetically, means cooperating with said magnetic storage means for providing a subsequent and separate impulse, means for moving said cooperating impulse providing means and said magnetic storage means relative to each other in accordance with movement of said movable element, and means responsive to said subsequent impulse for actuating said element to achieve the desired control of the apparatus.

17. In an apparatus of the class described, means movable to different positions, power motive means for moving said movable means to the different positions, a plurality of means to provide impulses indicating the positions to which the movable means is to move, a magnetic storage means corresponding to each impulse providing means for storing said impulses magnetically, means cooperating with said storage means for providing subsequent impulses by said magnetic storages, means for providing relative movement between said cooperating impulse providing means and said storage means in accordance with the movement of said movable means, and means to control the application of power to said motive means to move said movable means to different positions in response to said subsequent impulses.

18. An apparatus for controlling the operation of an elevator, which comprises means for providing an impulse indicative of the floor to which the elevator is requested to move and stop, means for storing the effect of said impulse in the form of magnetism, means adapted to be actuated as the result of the presence of said magnetism of said magnetic storage means for providing a subsequent and separate impulse, and means acting in response to said subsequent impulse for actuating an elevator driving means to cause the elevator to move to and stop at the floor requested.

19. In an elevator system, power motive means for moving an elevator to the different floors, a plurality of push buttons to provide impulses indicating the floors to which the elevator is to move, a magnetic storage means corresponding to each impulse providing means for storing said impulses in the form of magnetism, means cooperating with said magnetic storage means and actuated by said magnetism for providing subsequent impulses by said magnetic storages, and means to control the application of power to said power motive means to move said elevator to different floors in response to said subsequent impulses.

20. An electrically controlled elevator system comprising power means for moving an elevator to different floors, and means for controlling the application of said power means to said elevator, said latter means comprising a plurality of push buttons for providing impulses indicative of the floors to which the elevator is requested to be moved, means for storing the effects of said impulses in the form of magnetism, means for scanning the magnetism of said storages to provide a subsequent and separate impulse corresponding to each magnetic means in which there is magnetism, magnetic means for determining the position of said elevator with respect to the position to which it is requested to be moved, and means responsive to said subsequent impulses and to said position determining means for controlling the application of power to said elevator to move it to the requested floors.

21. In an elevator system, power motive means for moving an elevator to different floors, a plurality of push buttons located at the different floors to initiate impulses indicating the floors to which the elevator is to move and stop, a magnetic storage means corresponding to each such button for storing the effect of said impulses in the form of magnetic flux, whereby a magnetic storage results in those magnetic storage means which correspond to the push buttons from which impulses were initiated, a magnet adapted to be brought into proximity with said magnetic storage means whereby the interaction of the flux of said magnet and stored flux of said magnetic storage means may exert a relative movement between said magnet and said means, means for moving said magnet in accordance with the movement of said elevator car, electrical contacts associated with an electrical circuit and actuated by said relative movement to establish said circuit when said magnet is brought into proximity with a magnetic storage means in which an initiated impulse has been stored as magnetic flux, and means responsive to said established electrical circuit for actuating said power means to move said elevator to a desired floor and stop it.

22. An apparatus for controlling the operation of a movable element, which comprises means for providing an impulse indicative of an operation to be performed subsequently by the movement of the element in achieving the desired control, means for storing the effect of said impulse in the form of magnetism, means cooperating with the magnetism in the storage means for providing a subsequent and separate impulse in relation to the ability of the movable element to perform said subsequent operation, means for actuating said element, and means operating in response for said subsequent impulse for controlling the operation of said actuating means to achieve the desired operation of the element.

23. An apparatus for controlling the operation of a movable element, which comprises means for providing an impulse indicative of an operation to be performed subsequently by the element in achieving the desired control, means for storing the effect of said impulse magnetically, means for modifying the magnetic storage in relation to the condition of the movable element, means cooperating with the modified magnetic storage for providing a subsequent and separate impulse, means for actuating said element in response to said subsequent impulse for controlling the operation of said element.

DONALD R. PUTT.

(References on following page)

REFERENCES CITED

The following references are of record in the file of this patent:

UNITED STATES PATENTS

| Number | Name | Date |
|---|---|---|
| 1,941,618 | Nemerovsky | Jan. 2, 1934 |
| 1,970,304 | Graham | Aug. 14, 1934 |
| 1,989,630 | Stevens | Jan. 29, 1935 |
| 2,080,100 | Tauschek | May 11, 1937 |
| 2,105,318 | Goldsmith | Jan. 11, 1938 |
| 2,119,064 | Wanatable | May 31, 1938 |
| 2,266,064 | Muller | Dec. 16, 1941 |

FOREIGN PATENTS

| Number | Country | Date |
|---|---|---|
| 485,930 | Great Britain | May 24, 1936 |